(12) United States Patent (10) Patent No.: US 11,102,182 B2
Sammet et al. (45) Date of Patent: Aug. 24, 2021

(54) SYSTEMS AND METHODS FOR DYNAMICALLY AND RANDOMLY ENCRYPTING AND DECRYPTING DATA

(71) Applicant: CYPHYX, LLC, Bonita Springs, FL (US)

(72) Inventors: Charles C. Sammet, Latonia, KY (US); Alan Mintzer, Ocala, FL (US)

(73) Assignee: Cyphyx, LLC, Bonita Springs, FL (US)

( * ) Notice: Subject to any disclaimer, the term of this patent is extended or adjusted under 35 U.S.C. 154(b) by 85 days.

(21) Appl. No.: 16/691,258

(22) Filed: Nov. 21, 2019

(65) Prior Publication Data
US 2020/0112546 A1 Apr. 9, 2020

Related U.S. Application Data

(62) Division of application No. 16/210,148, filed on Dec. 5, 2018, now Pat. No. 10,587,589, which is a division of application No. 15/236,378, filed on Aug. 12, 2016, now Pat. No. 10,193,872.

(60) Provisional application No. 62/204,197, filed on Aug. 12, 2015, provisional application No. 62/204,167, filed on Aug. 12, 2015, provisional application No. 62/204,229, filed on Aug. 12, 2015.

(51) Int. Cl.
*H04L 29/06* (2006.01)
*G06F 21/12* (2013.01)
*H04L 9/32* (2006.01)

(52) U.S. Cl.
CPC ........ *H04L 63/0428* (2013.01); *G06F 21/123* (2013.01); *H04L 9/3234* (2013.01); *H04L 63/0853* (2013.01)

(58) Field of Classification Search
USPC ........ 713/150, 163, 168, 181; 726/2, 21, 36; 380/255, 264, 276
See application file for complete search history.

(56) References Cited

U.S. PATENT DOCUMENTS

| | | | | |
|---|---|---|---|---|
| 7,359,883 B2* | 4/2008 | Namba | ................. | H04N 7/165 348/E5.004 |
| 7,957,526 B2* | 6/2011 | Fujiwara | ............... | H04L 9/0637 380/44 |
| 8,160,246 B2* | 4/2012 | Kim | ..................... | H04L 9/0836 380/44 |
| 8,689,338 B2* | 4/2014 | Perrin | .................... | G06F 21/71 726/26 |
| 9,038,191 B2* | 5/2015 | Seleznev | ................ | G06F 16/00 726/26 |

(Continued)

*Primary Examiner* — Sharif E Ullah
(74) *Attorney, Agent, or Firm* — Andrew R. Shores; F. Michael Sajovec; Williams Mullen

(57) ABSTRACT

A system and method for encrypting and decrypting information is presented. In some embodiments, an endpoint token management system is provided for facilitating dynamic and random encryption and decryption methods. The system and methods may be employed in virtually any system or network, and may be used to protect virtually any type of data, whether at rest (data storage), in motion (data transfer), or in use. In some embodiments, synchronization points are used as analogs for encryption/decryption keys, enabling the encrypting system and decrypting system to begin randomly altering encryption data in a like-manner, thereby creating a constantly changing encryption field that is virtually impossible to decrypt without authorization.

8 Claims, 28 Drawing Sheets

(56) References Cited

U.S. PATENT DOCUMENTS

2010/0228971 A1* 9/2010 Carles .............. H04N 21/25816
                                                        713/163

* cited by examiner

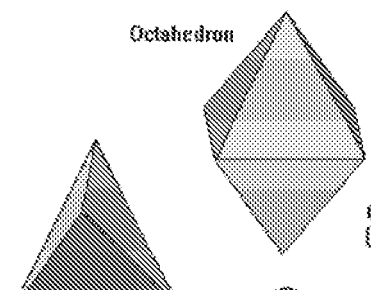
Figure 8A
Figure 8E
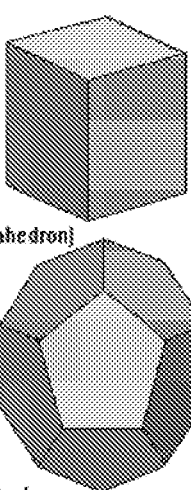
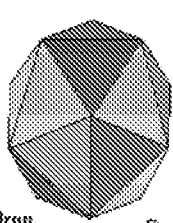
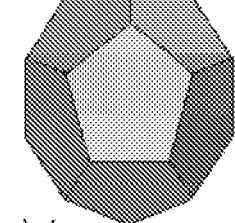
Figure 8B
Figure 8C
Figure 8D

0   0123456789ABCDEFGHIJKLM&*GKLF35 4WXYZ!@#$%^&*3GRIOC
1   DFERTYGH8NMJKLOIUER3V54321GYUZVBGFSKDFGJYRQWASZXCV
2   TREWQYUIOP456781Y3LK)H$*&IDXH3WENM453KJHJILS6IU78P
3   MNVBGHJKDROIT532HWSA8EXZASDMBNKLQPLKAZXCMNVBT45963
4   YT45601WEQR3420907PORC2QAZXCDTUVHKYUOP432QL23K4J56
5   76LK34LJHGSDEWQR84567184362354DF876456LKUPOI632MIL
6   3KK54J56J4454J6KPJ8VSMNR7RTYT6ZVB2FRTJYIWWQJS98AAJS
7   KK4SL6K7LRWEIUTP8IPOQ@XZASDMB3WEREWQW456721DVCGRVV
8   128LKTY0X@FKGJT5Y7KFL#2QA2XCDNKL7890345LFLGKDJSHAS
9   3421KJSH6OIPOI78HOGFQX84362J5FU9YUYO98342KKLKSRFGT
-   YT45601WEQR3420987PORCGFDSAXC354HKYUOP432QL23K4J56
1   76LK34LJHGSDEWQR84567JR7RTYT6LKS8764S6LKUPOI632MIL
2   3KK54J56J4454J6KTJ8VMNXZASDMBMF62FRTJYIWWQJS98AAJS
3   MNVBGHJKDROIT532HWSA8EWNOPQKSFGTQPLKA2XCMNVBT45963
4   YT45601WEQR3420927PORCPOI8976NKLHKYUOP432QL23K4J56
5   76LK34LJHGSDEWQR845671GFDSAXCF09676456LKUPOI632MIL
6   3KK54J56J4454J6K8JBVMNR7RTYT63542FRTJYIWWQJS98AAJS
7   TREWQYUIOP456781GJLKJHXZASDMB1WENM453KJH21LS6IU78P
8   MNVBGHJKDROIT532BWSA8E2QAZXCDNKLQPLKAZXCMNVBT45963
9   YT45601WEQR3420927PORCB436235F09HKYUOP432QL23K4J56
```

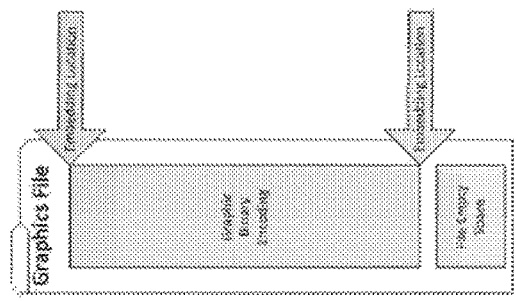
Figure 17A
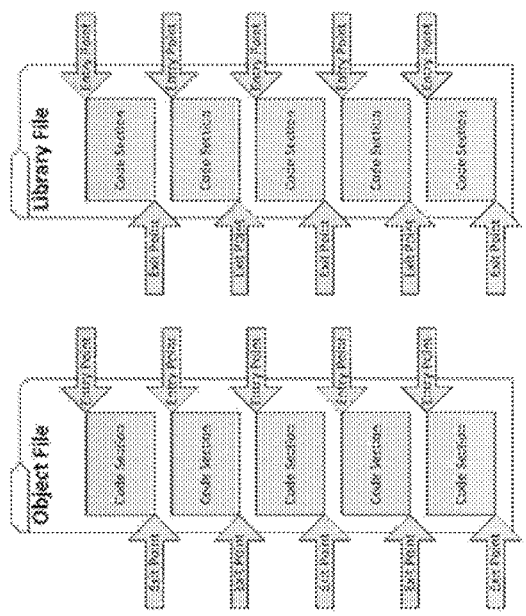
Figure 17C
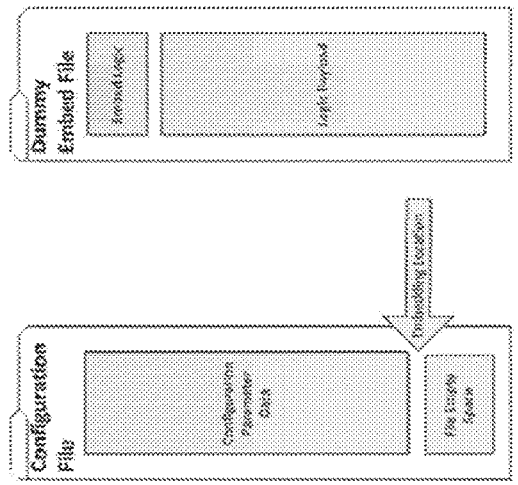
Figure 17B
Figure 17D
Figure 17E

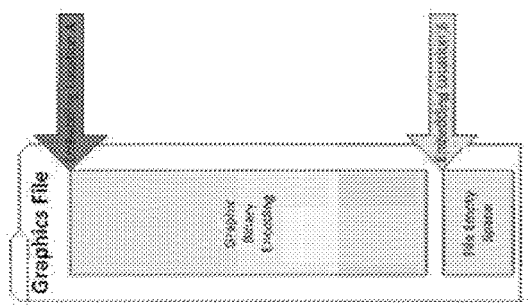
Figure 19C
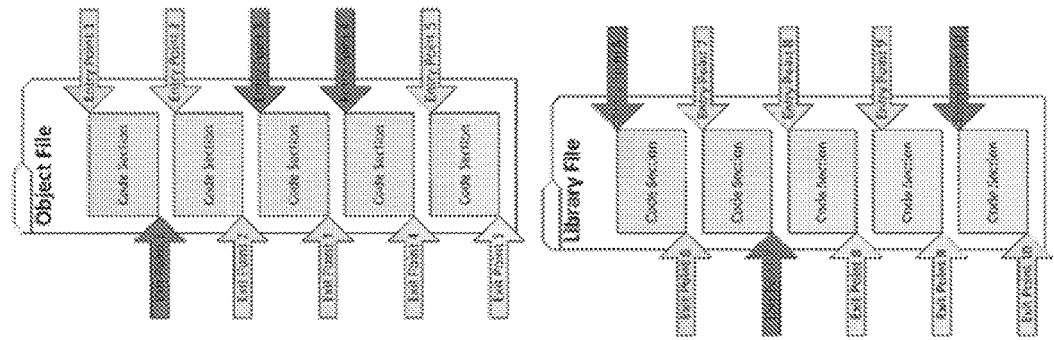
Figure 19A
Figure 19B

SYSTEMS AND METHODS FOR DYNAMICALLY AND RANDOMLY ENCRYPTING AND DECRYPTING DATA

CROSS REFERENCE TO RELATED APPLICATIONS

This application is a divisional of U.S. Utility application Ser. No. 16/210,148 filed on Dec. 5, 2018, which is a divisional of U.S. Utility application Ser. No. 15/236,378 filed on Aug. 12, 2016, which claimed the benefit of U.S. Provisional Patent Application Nos. 62/204,167; 62/204,229; and 62/204,197, each filed Aug. 12, 2015. Each of the foregoing referenced applications are incorporated in their entirety herein by reference.

TECHNICAL FIELD

The present invention relates to systems and methods for securing and protecting information, and/or securely transmitting the same between two or more users. More particularly, the present invention relates to a license management system for deployment within a computer network for the secure control of software applications within the computer network.

BACKGROUND

Secure Endpoint Token

Security is a major concern. The ability to secure information when using a computer can be difficult, inconvenient, and not very effective. Being able to ensure that someone with elicit intentions is not able to steal the information or intellectual property, whether from a user of that property or the owner and distributor of that property, can be almost impossible. No matter what system of controls is implemented all have a common weakness. That weakness is generally the need to be installed on a remote piece of hardware. Anytime security software is installed on a remote piece of hardware and then runs in a third-party environment such as Microsoft Windows, it is vulnerable. The vulnerability results from the need of the operating system to leave openings for other products to interoperate as well as to debug when problems arise. But these openings leave open opportunities for a person or system (e.g., virus) with illicit goals to thwart and circumvent whatever system of controls has been created to protect the information and intellectual property.

Dynamic and Random Encryption:

Encryption in use today typically relies on its complexity to thwart any attack. This protection is similar to a person standing in the middle of a field far away from anyone. While they stand alone they are generally safe and secure and no one can attack their data, but at some point in time a hacker may take notice and using his virtual weapons take a shot at them from miles away. In this hypothetical, the shot has little chance of hitting the person, so the hacker begins a quest to get closer to the target, every so often taking another shot. Eventually the hacker is very close and his shot hits its mark—unveiling the secret information that was hidden. This is often the case when using the current encryption algorithms and, as most entities do, only change the encryption key periodically over a lengthy period of time. Because of the length of time that the same key is used, it effectively becomes static and a target for a hacker.

Efforts have been made with encryption to make it ever more complex through the actual mathematical algorithm used for such encryption. While this may provide a short-term solution, it is by no means a permanent solution. As hardware improves and become ever more advanced and its speed increases, the math needed to thwart the breaking of encryption will need to become ever more complex.

Encryption can be both cumbersome and processing intensive. A balance if often struck when either the hardware on which the encryption is performed has to be of a level that can handle the strength of encryption needed for a given task or the strength of the encryption has to be reduced to allow less powerful hardware to handle execution of the encryption. In many cases this leads to encryption involving a single algorithm using a single key for all data encryption. This leads to a level of encryption that can be cracked in a very short time regardless of what algorithm is used. To strengthen encryption, the typical strategy is to increase the number of keys used as well as the frequency of how often they change. This works well, but requires either a lot of offline secure data transfer of keys or the initial sharing of a large number of keys which require a lot of storage space.

Since current encryption measures have been shown to be vulnerable to attack, a more complex implementation was needed. It would be desirable to have a system and method that both leverages current infrastructure for popular encryption algorithms as well as introduces a higher level of complexity to the process while allowing for scalability to ensure continued security into the future.

At the same time, any new system and method would ideally be capable of being scaled to function on varying platforms—e.g., as small as a smart chip microprocessor as well as platforms as large as mini- and main-frame computers. It would also be desirable to have a self-contained system that is molecular in design so that it could function without a large amount of management and control. Such a system would ideally be dynamic and constantly changing to make it a very difficult target for black-hat hackers. It would also be desirable to have an appearance to those outside observer as being random and unpredictable.

Since passing encryption parameters or data in the data stream would create a large vulnerability and since alternative channels may still leave this vulnerability as well as introduce issues of synchronization between messages, an alternative solution is needed. Pre-shared data was one option, but in previous implementations, this was usually done in a structured fashion where either a set of encryption keys were pre-shared or other encryption parameters specifically defined were pre-shared. This led to vulnerability in circumstances where a black-hat hacker could discover the pre-shared data and thus become able to decrypt future encrypted data using this discovery.

Persistent Software Integrity

Existing software fails to perform extensive scanning for the specific purposes of locating places within program executables where, for instance, license verification instructions could be inserted. Additionally current software scanning does not look for points where a program could be infected by software instructions having the characteristics of a benign Stealth Execution. Those programs in the marketplace which do scan software programs are typically used and intended to find locations in the software for determining the function of the software and then allowing someone to reverse engineer its actions. This is used for increasing the efficiency of the software, but not to actually insert external instructions or to provide for the insertion of software instructions having the characteristics of a Stealth Execution.

Protecting software systems, assets and intellectual property can be difficult if not impossible. There have been attempts and some sophisticated concepts, but few have had any success. The biggest problem has been that it takes multiple pieces to create a good solution and typically much attention has been directed at the activation or enablement function within the application being protected. In this regard, the prior efforts have been to secure these functions within the application. Solutions such as calculated hashes and checksums as well as encryption of check values and encryption of the program itself have been tried and yet little success has been forthcoming.

Like a chain, good anti-piracy measures have many links and the biggest problem is always the weakest of these links. In all cases this has been the ability to secure the application and prevent removal of the license verification, activation, or enablement functions. Once an application has been "cracked" as it is sometimes called its license verification is disabled and its able to be distributed freely resulting in a severe impact to the owner of that intellectual property.

SUMMARY

An endpoint token management system configured for deployment within a computer network is provided. The computer network has at least one client computer and at least one management server. The system includes at least one endpoint token, the token comprising a tamper sensitive housing with a communication bus and an external visual display, the housing defining a housing interior, disposed within the housing interior are a memory storage module, an endpoint processor, a power supply, and an endpoint communication module, each of the bus, display, storage module, endpoint processor, power supply, and communication module are in operable communication, with the bus configured to engage with the at least one client computer. The endpoint communication module comprises a receiver and a transmitter, for reception and transmission of communication with devices within the computer network. The memory storage module comprises a first memory and a second memory with programming code stored on the second memory, the programming code comprising an endpoint token operating system, an interface server software by which a user may access applications or application data on the endpoint token when such server software is executed by the endpoint processor, an endpoint token communication software, that when executed by the endpoint processor is configured to track a queue of messages received, waiting to be transmitted, and transmitted by the endpoint communication module, and encryption software configured to encrypt or decrypt messages received and transmitted by the endpoint communication module when executed by the endpoint processor. The system further includes management software comprising server programming code configured for execution by the at least one management server. The management system includes management communication software configured to track a queue of messages transmitted to, waiting to be transmitted to, and received from the endpoint token when executed by a management server processor when such server is in communication with the endpoint token, a management encryption software configured to encrypt or decrypt messages received and transmitted to the endpoint token when executed by a management server processor when such server is in communication with the endpoint token, and a management controller software configured, when the management controller software is executed by the management server processor, to create a virtual operating environment having a virtual endpoint token associated with each of the at least one endpoint token, the virtual endpoint token having a virtual endpoint token operating system operable within the virtual operating environment. The management controller software is further configured, at a desired time when such server is in communication with the endpoint token, to synchronize the endpoint token operating system with the virtual endpoint operating system by transmitting one or more synchronizing messages to the endpoint token. The first memory is a private memory isolated from the management software, and the second memory is a public memory available to the management system. The programming code stored on the second memory further comprises token controller software to engage with the synchronizing messages from the management controller software to synchronize the endpoint operating system with the virtual endpoint token operating system using the one or more synchronizing messages.

BRIEF DESCRIPTION OF THE DRAWINGS

FIGS. 8A-8E are depictions of different geometric shapes that can be used to overlay data in the multidimensional table in order to further increase the complexity of the evolution of a data table as it is modified and used in the presently disclosed systems and methods.

FIG. 9 is an example of a given level of the multidimensional table showing how data may appear inside the table in certain exemplary aspects of the present disclosure.

FIG. 11 illustrates an example of a given side for one of the nested dimensions referenced in the multi-dimensional table according to certain exemplary aspects of the present disclosure.

FIG. 12A illustrates a next set of moves for the method illustrated in FIG. 12, according to one example.

FIG. 12B illustrates a value that could be created by moves illustrated in FIGS. 12 and 12A.

FIG. 13 illustrates an example of applying an algorithmic change to a data table as a means of modification according to certain aspects of the present disclosure.

FIGS. 17A-17E illustrate exemplary locations that may be found within certain exemplary file types for embedding logic according to certain exemplary aspects of the present disclosure.

FIG. 19A-19C depict exemplary applications substantially similar to the one depicted in FIGS. 18A-18C, but show how the same application might appear when an install of the application is initiated, according to certain exemplary aspects of the present disclosure.

DETAILED DESCRIPTION

Figure 1:
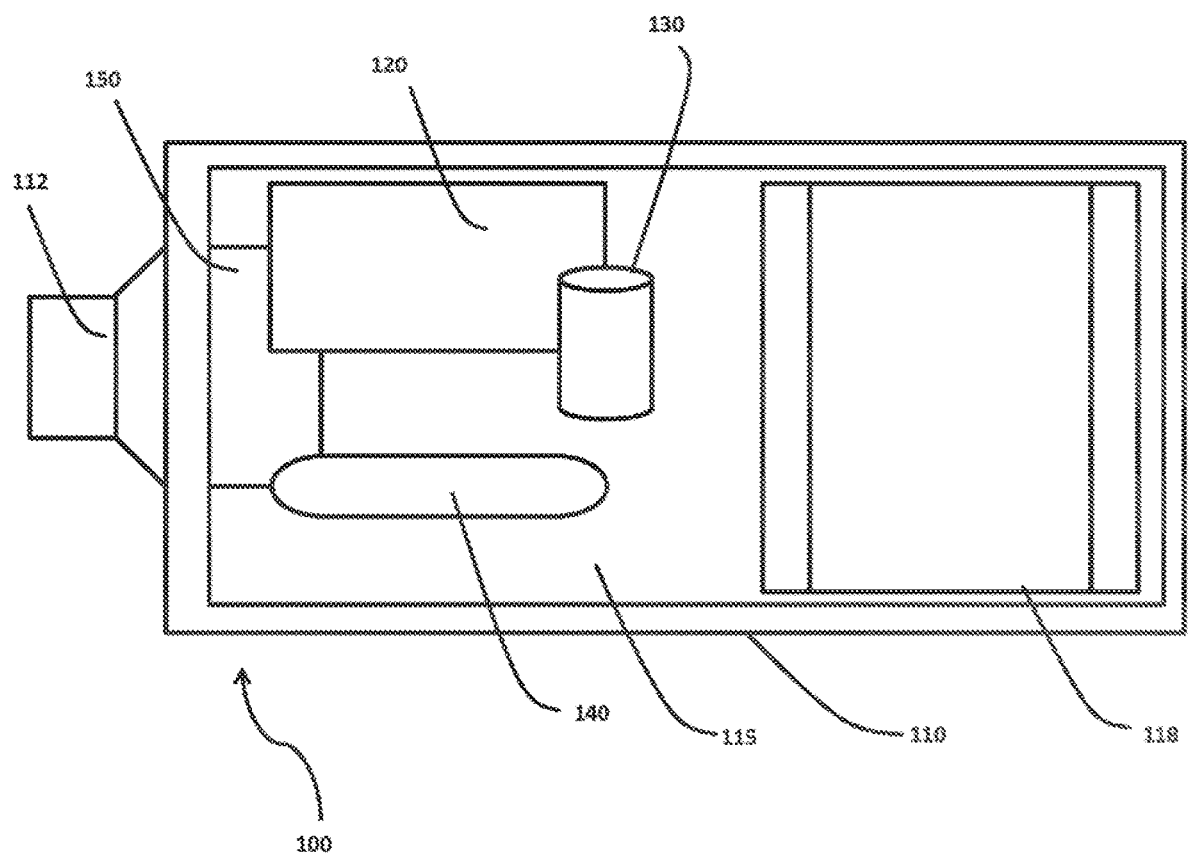
FIG. 1 is a schematic view of an exemplary embodiment of the presently disclosed secure endpoint token.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Secure Endpoint Token:

One embodiment of this invention is the ability to provide a secure remote connection to an end user such that private interactions between users (including outside services) can take place without the concern of having those interactions eavesdropped on or intercepted. The present disclosure contemplates systems and methods for protecting intellectual content so that providers may allow access to their content in a secure manner and without being concerned about having their content stolen. In various embodiments, the present disclosure describes methods and systems for individuals to access information and content without great hindrance such that the system and methods allow for secure and easy access to personal, financial, and medical information stored internally or externally (e.g., in a cloud server), or information shared between users.

In some embodiments, a remote secure endpoint device is restricted from tampering and has a management system that connects with it such that it becomes a single virtual device (e.g., from individual to cloud). In some embodiments, the connection between a secure endpoint and a management system securely handles interruptions to communications, and uses self-contained individual packet messaging. Changes sent to the endpoint may include requirements that they can be sent in small bursts over long periods since it may not be known when the endpoint might be available to connect with the management system. In various embodiments, a tight connection between endpoint and management system creates a singular device that provides the user secure access to their property and/or information.

In some embodiments, the system provides tools by which a user can carry information with them without the need to worry about losing it. The endpoint acts as a key to the user's information that only they can access, use and if lost or stolen, can easily be recovered. These features provide benefits for both intellectual content providers as well as users who access such content.

In some embodiments, the system and methods facilitate the interface of other cloud based applications to the populating of Endpoint Tokens giving the cloud based applications the ability to maintain the token holder's data that exists on the cloud server(s) and maintains the Endpoint Token application that the cloud based application uses for providing access to the token to the cloud based application and its data. In this embodiment, the Endpoint Token could be used for Software licensing, financial record, medical records, or just about any application where secured verified access is needed by the end user holding an Endpoint Token.

Referring now to FIG. 1, an exemplary embodiment of a Secure Endpoint Token 100 is provided. In one exemplary embodiment, the Secure Endpoint Token 100 may include, for example, a tamper sensitive housing 110 that includes a housing interior 115, a communication bus 112, and an external visual display 118. The housing 110 may also include a memory storage module 120, an endpoint processor 130, a power supply 140, and an endpoint communication module 150. Each of the bus 112, display 118, storage module 120, endpoint processor 130, power supply 140, and communication module 150 may be in operable communication. Bus 112 may also be configured to engage with at least one client computer.

The endpoint communication module 150 may also include a receiver and a transmitter. The storage module 120 may also include a first memory partition and a second memory partition. In some embodiments, programming code may be stored on the second memory partition, wherein the programming code may include an endpoint token operating system, an interface server software, and an endpoint communication software. The endpoint communication software may, in some embodiments, be configured to track a queue of messages or target data elements received, waiting to be transmitted, and/or transmitted by the endpoint communication module. The software may also include encryption software configured to encrypt or decrypt messages or target data elements received and/or transmitted by the endpoint communication module 150.

Figure 2:
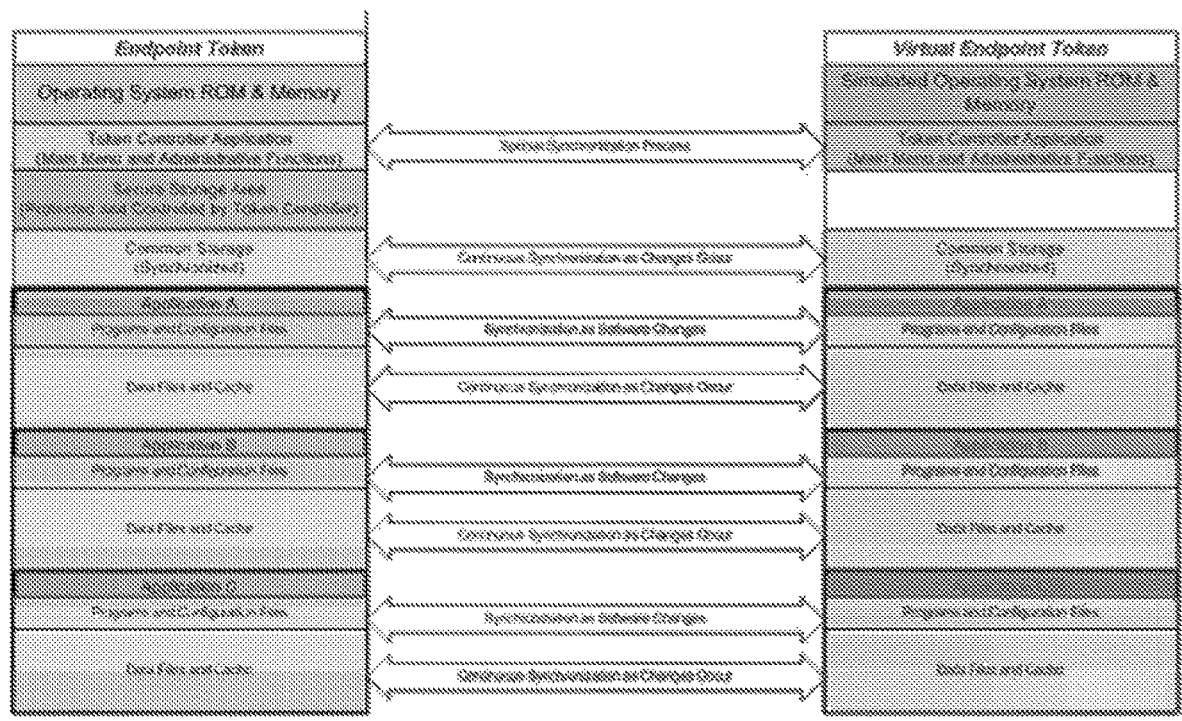
FIG. 2 is an illustrative block diagram of endpoint token application/data partitioning and synchronization according to certain aspects of the present disclosure.
Figure 21:
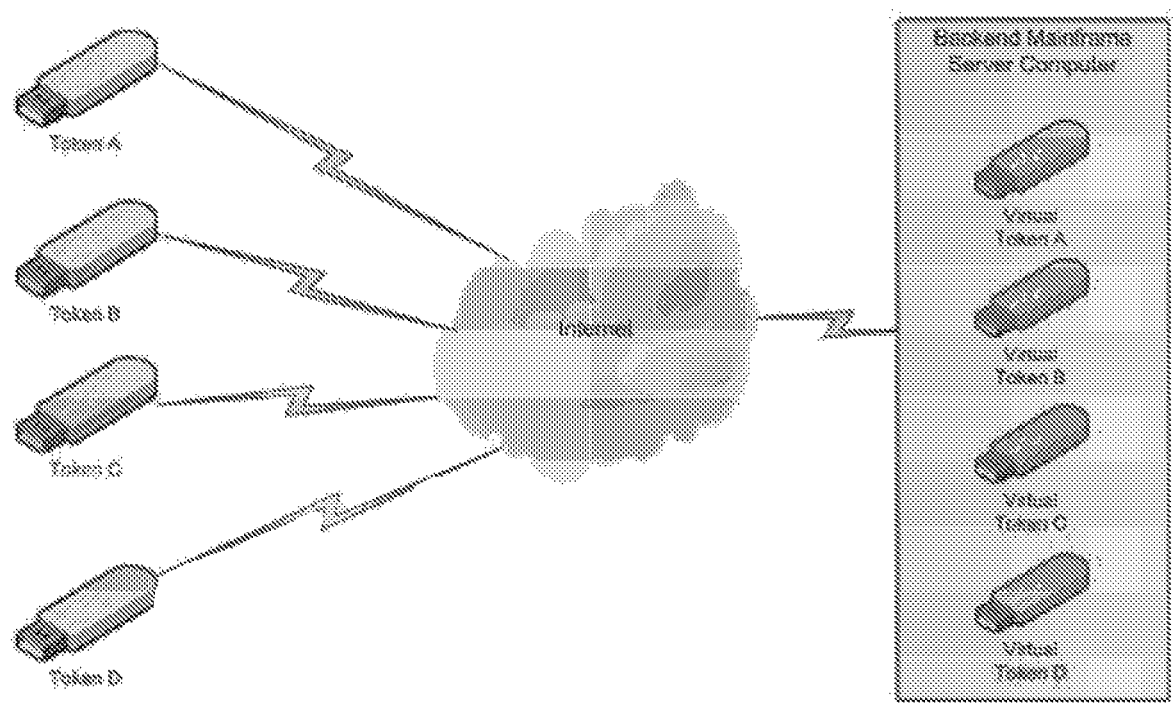
FIG. 21 depicts an exemplary embodiment of the virtualization of the Endpoint Tokens and how each token in use may have its own virtualized copy on a backend server, according to certain exemplary aspects of the present disclosure.
Figure 22:
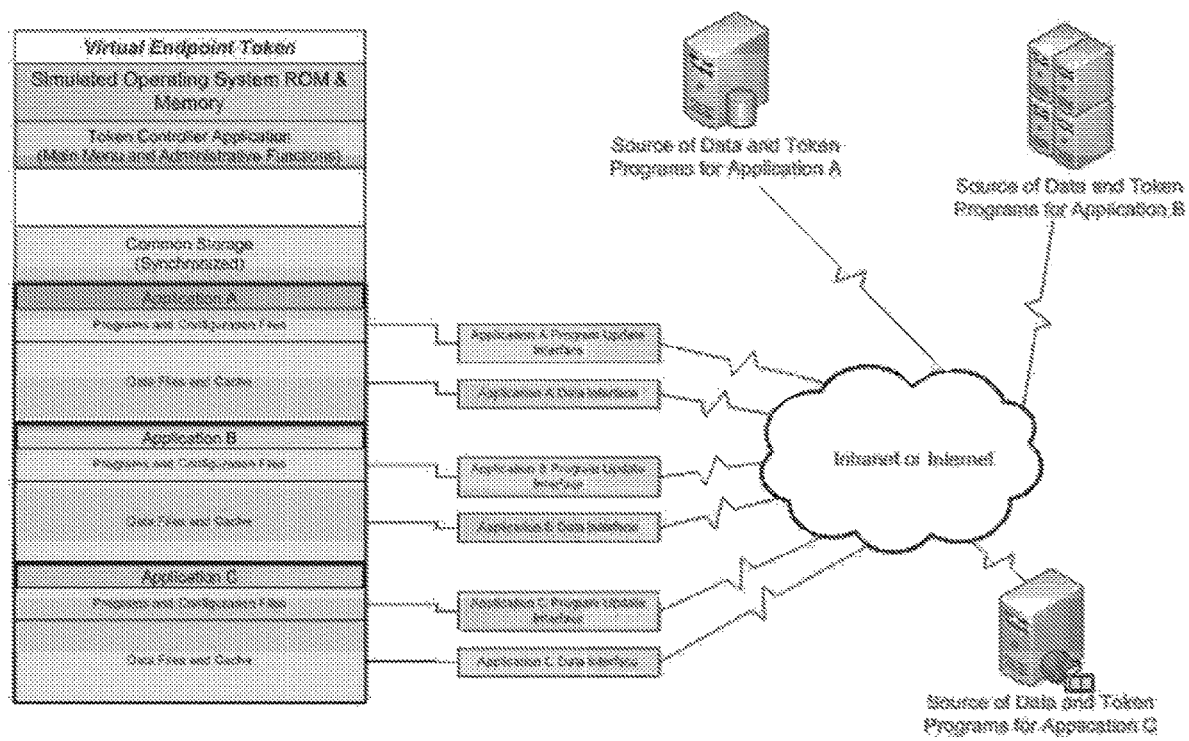
FIG. 22 illustrates an exemplary embodiment of a potential relationship between virtual endpoint tokens and backend server applications using endpoint tokens, according to certain exemplary aspects of the present disclosure.
Figure 23:
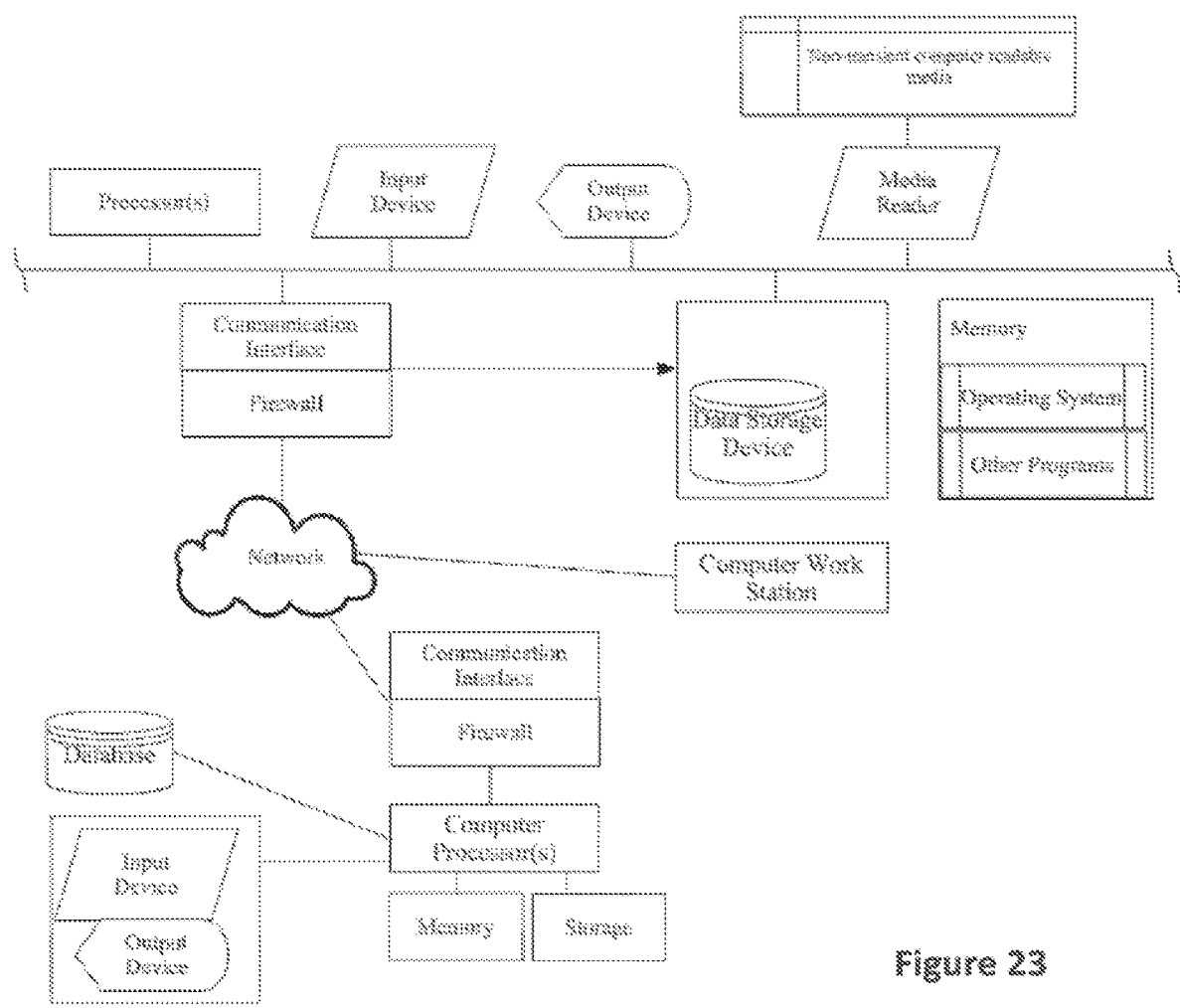
FIG. 23 illustrates a schematic exemplary embodiment of the presently disclosed system.

The Secure Endpoint Token 100 may also include a management software that includes server programming code configured for execution by a management server. The management system may include a management communication software, a management encryption software, and/or a management controller software. In some embodiments, as shown for example in FIG. 2, the management controller software may create one or more virtual operating environments having a virtual endpoint token associated with each of the at least one endpoint tokens. The virtual endpoint token may include a virtual endpoint token operating system operable within the virtual operating environment. The management controller software may be configured to synchronize the endpoint token operating system with the virtual endpoint token operating system by transmitting one or more synchronizing messages to the endpoint token. Referring now to FIG. 21, an exemplary depiction of the virtualization of the Endpoint Tokens and how each token in use may have its own virtualized copy on a backend server is presented. FIG. 22 depicts an exemplary embodiment of a potential relationship between virtual endpoint tokens and backend server applications using endpoint tokens. Exemplary interface processes are shown and how they might interact with a specific given application is presented. In some embodiments, the interface processes of FIG. 22 could operate as web services to facilitate the connection between remote servers and the Virtual Endpoint Tokens. FIG. 23 presents an exemplary embodiment of the presently disclosed system in schematic form.

Referring again to FIG. 1, the first memory in storage module 120 may be a private memory isolated from the management software, and the second memory in the storage module 120 may be a public memory available to the management system. The programming code stored on the second memory may also include a token controller software to engage with the synchronizing messages from the management controller software to synchronize the endpoint operating system and the virtual endpoint token operating system using one or more synchronizing messages.

Figure 3:
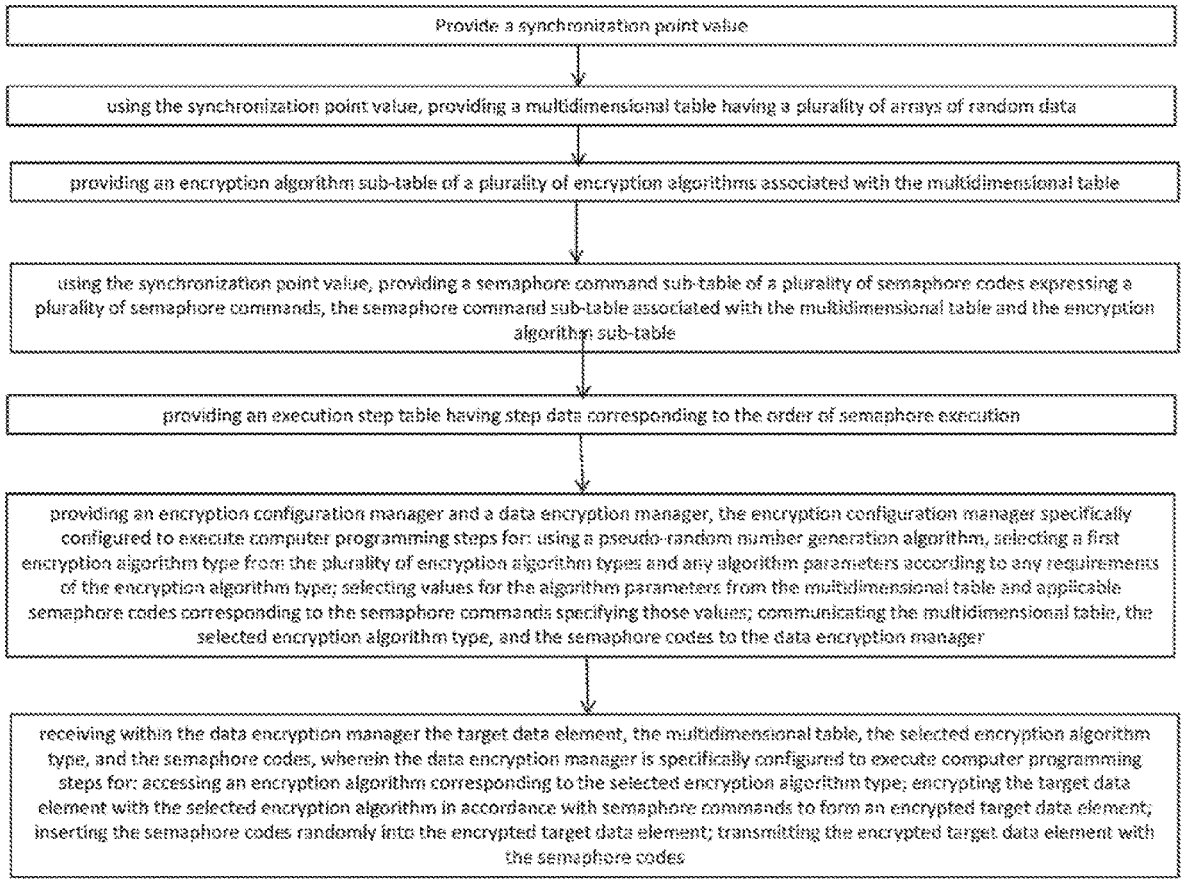
FIG. 3 is a flow chart illustrating certain steps of the presently disclosed encryption method that may be implemented on presently disclosed systems.

Referring now to FIG. 3, in some embodiments, the Secure Endpoint Token 100 (FIG. 1) and management encryption software may be configured to provide a synchronization point value. The synchronization point value may be used to seed an initial Pseudo-Random Number Generator that may create, for example, a multidimensional table, a semaphore cross-reference table, and an Execution Step table. In some respects, the synchronization point may be thought of as a rendezvous point for two parties wishing to exchange encrypted data to meet. This allows them both to arrive at the same starting values without completely disclosing those values or requiring them to be shared. By using the synchronization point as a starting point from which to then grow and alter the data used for encryption in an infinite number of possible pathways, the target data elements may be more securely encrypted. In this manner, an attacker would be unable to deduce the values being used even if the synchronization point were known. In addition, target data elements may include portions of whole data elements to be encrypted, thereby enabling the independent encryption of multiple elements of a set of data to be encrypted, further enhancing the security of the data. For example, even if an attacker could decrypt one target data element, the presently disclosed systems and methods would still protect the significant remainder of other encrypted data elements.

Figure 24:
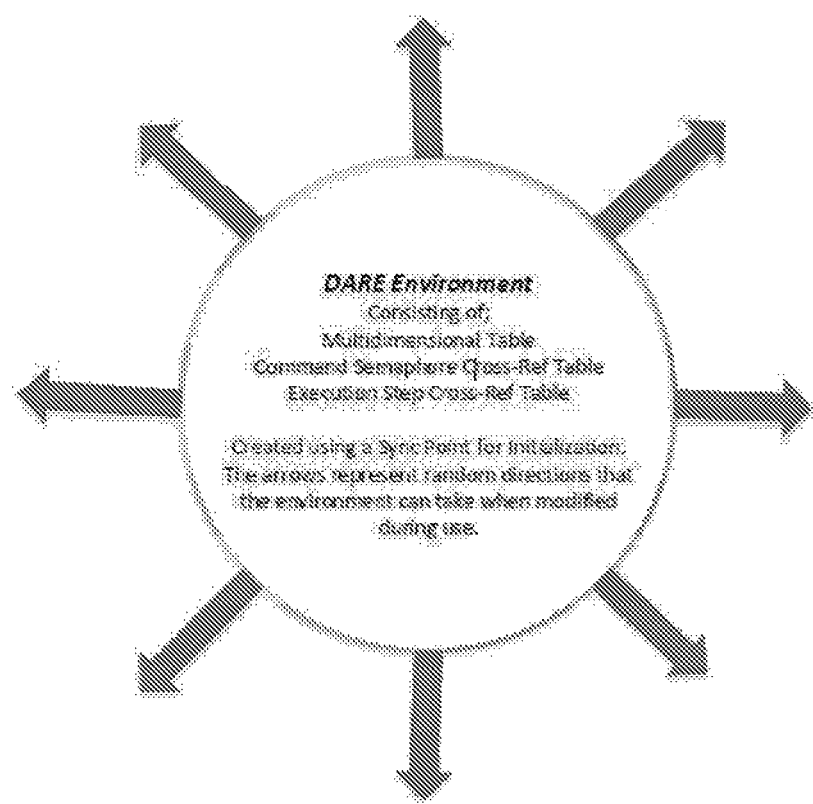
FIG. 24 represents an illustrative example of an environment referred to as the "DARE Environment" with arrows representing the random directions the environment can take.

Referring now to FIG. 24, an exemplary embodiment of the present disclosure utilizing a synchronization point is presented. For example, once the synchronization point is established between the two users (or between the encrypting and decrypting systems generally), FIG. 24 illustrates how the multidimensional tables, command semaphore cross reference tables, and/or execution step cross reference tables can evolve in any random direction. Advantageously, however, because both the encryption and decryption systems will evolve in the same manner from the same synchronization point, the encrypted target data elements may be decrypted by the system. However, even if an attacker managed to determine the synchronization point value, the attacker would not be able to replicate the random table modifications developed from the synchronization point. Indeed, after the initial environment is used even once, it moves away from the synchronization point in random directions that are different even if the synchronization point is utilized again.

Figure 25:
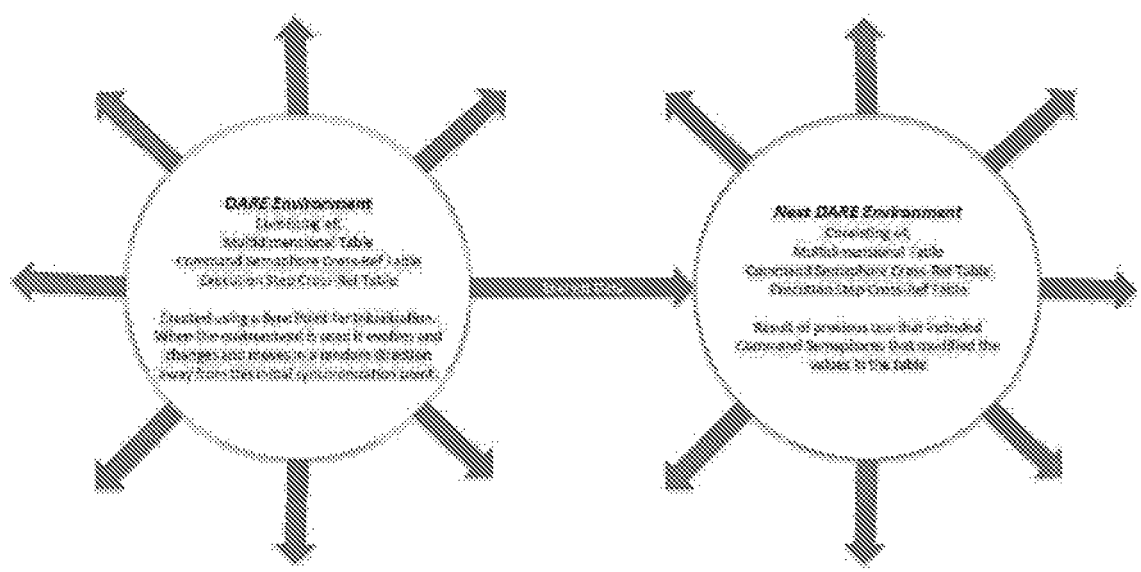
FIG. 25 represents an illustrative example of two exemplary "DARE Environments," the "Next DARE Environment" resulting from movement from the original "DARE Environment."

Referring now to FIG. 25, each time the environment is used to encrypt data it modifies the values in the tables involved in a random manner. This modification results in organically grown data that is dynamically and randomly changed with each use. When the decryption is performed by another entity with whom the original synchronization point has been shared it too has the environment it is using modified and changed to match the environment that the encrypting part is using. In this manner the two entities remain in sync with their environments and this provides the means for continued secure communications. If the two parties ever do become out of sync regarding their environments they merely need return to the original Sync Point or use another new Sync Point at which to rendezvous and they are back into a secure mode.

Figure 26:
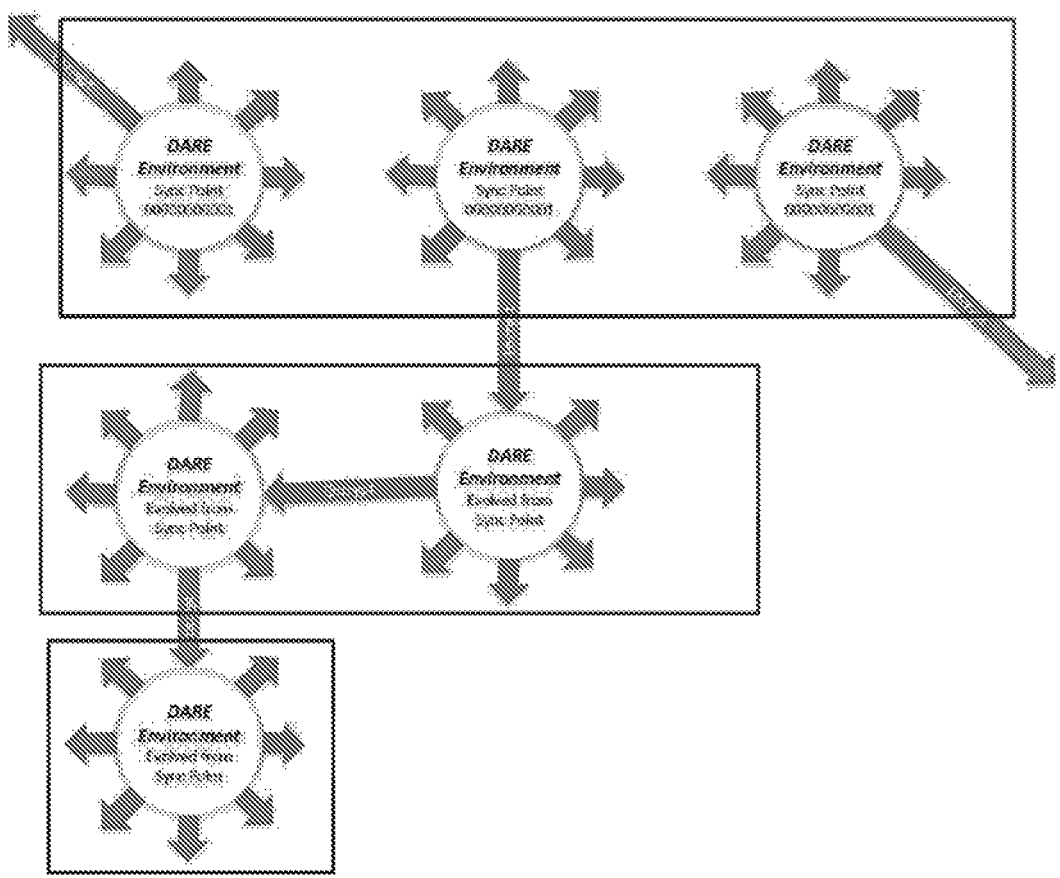
FIG. 26 represents yet another illustrative example of multiple and interconnected DARE environments.

Referring now to FIG. 26, each time the environment is used it moves in a random direction from the original state of the environment as well as the original Sync Point that was used to initialize the encryption. Even if the same Sync Point is repeatedly used the encryption is completely different each time and the movement away from the Sync Point happens in a completely different direction making it impossible to replicate even if the Sync Point were known.

A sub-table of a plurality of encryption algorithms associated with the multidimensional table may also be provided, and a plurality of semaphore codes expressing a plurality of semaphore commands may be generated and provided.

The management encryption software may also provide an execution step table having step data corresponding to the order of semaphore execution, and may also provide an encryption configuration manager and a data encryption manager, wherein the encryption configuration manager may be configured to execute certain steps. The steps to be executed may include, for example, using one or more randomly selected pseudo-random number generation algorithms to select a first encryption algorithm type from a plurality of encryption algorithm types and additionally, any associated algorithm parameters according to any requirements of the encryption algorithm type. The steps may also include selecting values for the algorithm parameters from the multidimensional table and applicable semaphore codes corresponding to the semaphore commands specifying those values. The steps may also include communicating the multidimensional table, the selected encryption algorithm type, and the semaphore codes to the data encryption manager.

The management encryption software may also be configured to receive a message or target data element, the multidimensional table, the selected encryption algorithm type, and the semaphore codes. Once received, the software may access an encryption algorithm corresponding to the selected encryption type, encrypt the target data element with the selected encryption algorithm in accordance with semaphore commands to form an encrypted target data element, insert the semaphore codes randomly into the encrypted target data element, and transmit the encrypted target data element with the semaphore codes.

Figure 4:
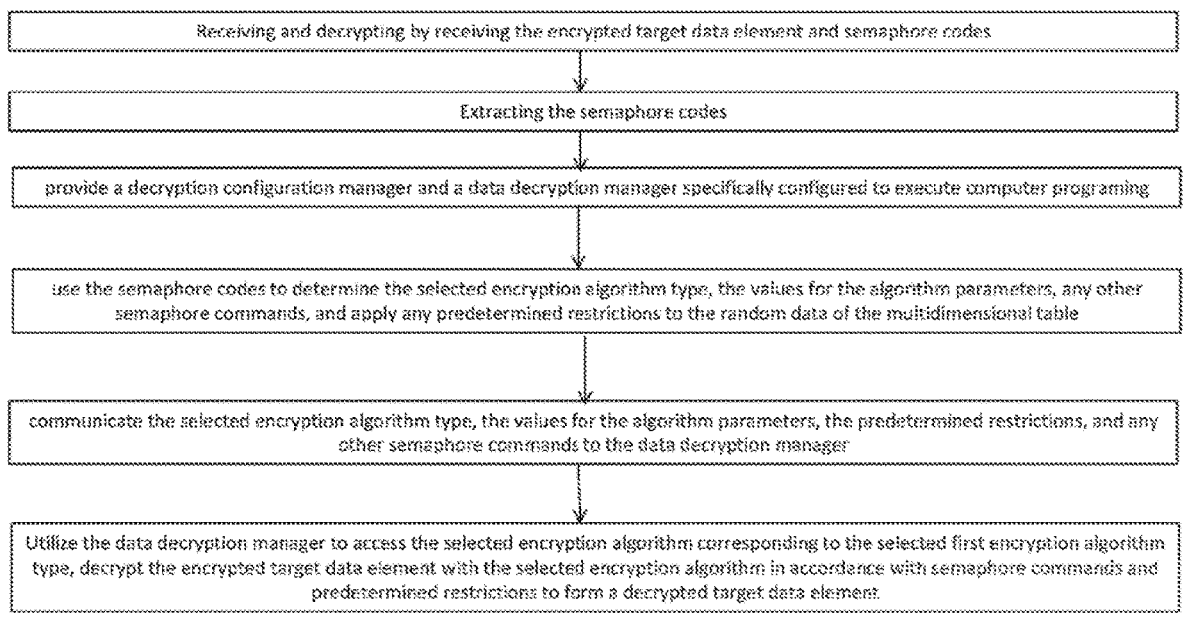
FIG. 4 is a flow chart illustrating certain steps of the presently disclosed encryption method that may be implemented on presently disclosed systems.

Referring now to FIG. 4, the Endpoint Token Management System 100 (FIG. 1) may also include management encryption software that is further configured to receive and decrypt target data elements. In some embodiments, the target data elements may be received and decrypted by receiving the encrypted target data element and semaphore codes, and extracting the semaphore codes. The software may then provide a decryption configuration manager and a data decryption manager specifically configured to execute computer programing. The programming may, in some embodiments, use the semaphore codes to determine the selected encryption algorithm type, the values for the algorithm parameters, any other semaphore commands, and apply any predetermined restrictions to the random data of the multidimensional table. The software may then communicate the selected encryption algorithm type, the values for the algorithm parameters, the predetermined restrictions, and any other semaphore commands to the data decryption manager. Once received, the data decryption manager may access the selected encryption algorithm corresponding to the selected first encryption algorithm type, decrypt the encrypted target data element with the selected encryption algorithm in accordance with semaphore commands and predetermined restrictions to form a decrypted target data element.

In certain other embodiments, systems and methods for exchanging data securely between users is presented. In some embodiments, a method for the dynamic management of encryption and decryption of target data elements having one or more target data sub-element provided by a local sender may be provided whereby encryption configuration applications for installation on one or more local computer processors may be provided. The encryption configuration application may be configured to receive the target data element from the sender and to transmit an encrypted target data element over a communication channel to a remote computer processor within a computer network. A decryption configuration application for installation on the remote computer processor. The remote computer processor may be the decryption point in the network, and may include one or more remote computer processors separated by one or more networks.

The encryption configuration application may specially configure the local computer processor for preparing and transmitting a target data element. In some embodiments, the encryption configuration application does this by, for example, providing a synchronization point value, and using the synchronization point value to provide a multidimensional table having one or more arrays of random data. An encryption algorithm sub-table of a plurality of encryption algorithms associated with the multidimensional table may then be provided, and the synchronization point value may be used to provide a semaphore command sub-table of one or more semaphore codes expressing a plurality of semaphore commands. The semaphore command sub-table may be associated with the multidimensional table and the encryption algorithm sub-table. Once again using the synchronization point value, an execution step table having step data corresponding to the order of semaphore execution may be provided.

An encryption configuration manager and a data encryption manager may also be provided, with the encryption configuration manager configured to execute computer programming steps for using a pseudo-random number generation algorithm to select an encryption algorithm type from the plurality of encryption algorithm types and any algorithm parameters according to any requirements of the encryption algorithm type. In some embodiments, the pseudo-random number generation algorithm may itself be selected randomly. Values for the algorithm parameters from the multidimensional table and applicable semaphore codes corresponding to the semaphore commands specifying those values may then be selected, and the multidimensional table, the selected encryption algorithm type, and the semaphore codes may be communicated to the data encryption manager. The data encryption manager may then receive the target data element, the multidimensional table, the selected encryption algorithm type, and the semaphore codes. Upon receipt, the data encryption manager may access an encryption algorithm corresponding to the selected encryption algorithm type, encrypt the target data element with the selected encryption algorithm in accordance with semaphore commands to form an encrypted target data element, inserting the semaphore codes randomly into the encrypted target data element, and transmit the encrypted target data element with the semaphore codes.

In some embodiments, the pseudo-random number generators may be one or more of AUS88 Pseudo Random Number Generator; ECUYER1988 Pseudo Random Number Generator; HELLEKALEK1995 Pseudo Random Number Generator; KREUTZER1986 Pseudo Random Number Generator.

To decrypt target data elements, in some embodiments, the decryption configuration application may be utilized. In one example, the decryption configuration application may configure the remote computer processor for receiving and decrypting an encrypted target data element by determining the synchronization point value, receiving the encrypted target data element and semaphore codes, extracting the semaphore codes, providing a decryption configuration manager and a data decryption manager and using the semaphore codes to determine the selected encryption algorithm type, the values for the algorithm parameters, any other semaphore commands, and to apply any predetermined restrictions to the random data of the multidimensional table. The decryption configuration manager may also communicate the selected encryption algorithm type, the values for the algorithm parameters, the predetermined restrictions, and any other semaphore commands to the data decryption manager. Upon receipt at the data decryption manager, in some embodiments, the encryption algorithm corresponding to the selected encryption algorithm type may be accessed and the encrypted target data element decrypted using the selected encryption algorithm in accordance with semaphore commands and predetermined restrictions to form a decrypted target data element.

Further details of the encryption and decryption methods disclosed herein will be provided later in the specification.

Various Embodiments

In some embodiments, the system and methods of the present disclosure may include one or more of the following embodiments and features:

Secure Endpoint Token can take any form factor and may be small enough to carry in a pocket or be incorporated into another mobile device (smart phone).

Secure Endpoint Token can use any communication means to access the internet or other computer network, whether by Wi-Fi, Bluetooth, Mobile Data using Cellular, or any other currently available means.

Secure Endpoint Token may include a lock by which the user can unlock it to use the content in a controlled and secure environment.

Secure Endpoint Token has a screen, whether touchscreen or not, that can display information about what is contained on the token and is secured.

Secure Endpoint Token has to consist of at least a processor, battery, memory, data communications channels, secure storage area, and a tamper proof shell that would destroy memory contents if the endpoint were damaged by an illicit attempt to access its components.

The Secure Endpoint Token can connect to a host PC through a Universal Serial Bus (USB) port for use and to charge the battery. It can also contain a RFID module to provide the means by which to wirelessly trickle charge the battery. This would eliminate the need to connect the token to any machine since access to it can be had through other wireless data communications channels as defined above.

Embodiments of a Secure Endpoint and Management system have a secure and encrypted communications channel that can function with sporadic and unpredictable interruptions, long delays between connections, and using a small messaging format to allow for quick bursts.

A Secure Endpoint may be capable of functioning on its own without connection to the management system for long periods of time.

Endpoint Management system may be capable of queuing messages for a given endpoint and maintain a sequence of messages such that the messages are delivered to the endpoint correctly.

The management system has to be capable of interfacing with any intellectual content management system available.

The Endpoint Token Management system maintains a virtual copy of the actual Endpoint and provides access to this copy such that a backend application that is using the Endpoint Tokens can access the data on the Token and have it be synchronized the next time the Endpoint Token connects.

The Endpoint Token Management system provides a framework for other cloud based applications to interface with it and to maintain data used by the respective cloud based application. The cloud based application can also maintain its own Endpoint Token version of its application for the Token user to interact with in viewing and using the data.

A Endpoint Token including a shell having a possible shape of a flat card, a dongle, or disc; a microprocessor; a memory on which data is stored; a set of wireless transmission modules (Wi-Fi, Bluetooth, Cellular); antennas for the wireless transmission modules; a USB connection; a user changeable battery for supplying power; an Radio Frequency ID (RFID) module for use in wirelessly trickle charging the battery; a user interface comprising; an LCD screen; buttons for user input; a touchscreen for user input; and a tamper proof coating that destroys the components when exposed to air.

The Present Disclosure may Include the Following Additional Features:

The Endpoint Token may include a built-in operating system on which small applications can be built and operated.

The Endpoint Token includes the ability to create a secure encrypted messages to be sent to a backend host Management system using the Internet.

The Endpoint Token may include a small proprietary web server to provide limited access to the secured contents of the token.

The Endpoint Token may include the ability to provide Web Services through the small proprietary web server, in addition to the ability to display other data through HTML pages The Endpoint Token may include the ability to connect to the backend host using one of the wireless transmission modules and that does not require connectivity to a host device in order to create this connection.

The Endpoint Token may include the ability to connect to a local host PC using one of the wireless transmission modules and the appropriate protocol supported by most current hardware, such as Bluetooth, Wi-Fi, XeeBee. Additionally, embodiments may have the ability to connect directly through a USB port as well.

The Endpoint Token may, for example, include the ability to utilize either a USB connection to charge the battery or by receiving a signal from an RFID scanner to use the rectified antenna energy to trickle charge a battery as well. Other power supplies or sources may be appropriate for other embodiments.

The Endpoint Token may include the ability to provide a user interface through either an LCD and navigation buttons, or a simple touchscreen LCD, or other like interface.

The Endpoint Token may include the ability to independently connect to a backend Management system located on a remote host via the Internet or other computer network.

The Endpoint Token may include the ability to queue messages for the backend Management system and to use these message to maintain the consistent synchronization of the Token memory contents with that Management system.

The Endpoint Token may include the ability to operate and provide use access to multiple applications through a Token Controller computer program.

The Endpoint Token may include the ability to be remotely reprogrammed by the Endpoint Token Management system such that the base operating system could be updated.

The Endpoint Token may include the ability to partition memory and to facilitate the organization of applications and data such that each area can be independently updated.

An Endpoint Token Management system consisting of an application to maintain virtual copies of the Endpoint Tokens and to perform interfacing with outside remote applications that use the Tokens as a means of user interface. Additionally this Management system provides housekeeping and maintenance for the Tokens to ensure their continued functionality, and to maintain the consistency of the Virtual Endpoint Tokens in relation to the actual Endpoint Tokens themselves.

The Endpoint Token Management System may include the ability to maintain copies of all registered Endpoint Tokens which communicate with it. These copies may be called "Virtual Endpoint Tokens."

The Endpoint Token Management System may include the ability to queue and send encrypted messages to the Endpoint Tokens. This queuing ability allows for the synchronization of the data between the Endpoint Tokens and the Virtual Endpoint Tokens The Endpoint Token Management System may include the ability to utilize for encryption currently available encryption methods, as well as proprietary methods described herein, such as that described under the Dynamic and Random Encryption embodiments.

The Endpoint Token Management System may include the ability to manage software and data for the Endpoint Tokens via the Virtual Endpoint Tokens The Endpoint Token Management System may include the ability to interface to other remote applications and to facilitate the connectivity between the remote applications and the Endpoint Tokens.

Figure 20A:
FIG. 20A-20C depict various exemplary form factors for Secure Endpoint Tokens according to certain aspects of the present disclosure.
Figure 20C:
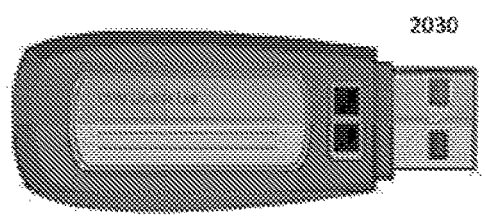
Figure 20B:
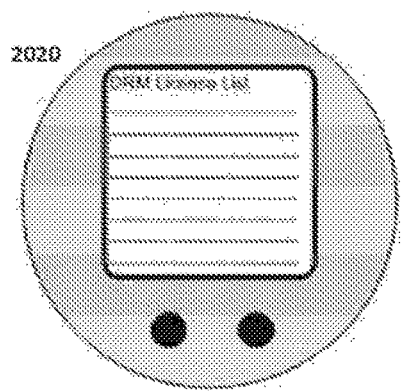

Referring now to FIGS. 20A-20C, various other possible form factors for Secure Endpoint Tokens according to certain aspects of the present disclosure are presented. For example, token 2010 illustrated in FIG. 20A may be a token comprising a credit card shape having an LCD screen and one or more navigation buttons. In certain other embodiments, a disc shaped token 2020 (e.g., FIG. 20B) may be employed having a screen and one or more navigation buttons. In yet other embodiments, a USB dongle shape 2030 (e.g. FIG. 20C) may be employed having a screen and one or more navigation buttons.

In some embodiments, the Endpoint Token consists of a microprocessor, memory, secure storage area, Wi-Fi module, Bluetooth module, RFID module, battery, touchscreen LCD or navigation buttons and an LCD, USB module, and a tamper proof shell that protects the device from being physically hacked since any attempt to open it results in the components and especially the memory being destroyed.

In some embodiments, the Endpoint Token operates as an independent device that can be accessed in a controlled manner from a host device such as a PC, smartphone, or other smart device capable of making a USB, Wi-Fi, or Bluetooth connection. The secured and controlled nature of the interface used within the Endpoint Token requires that any device accessing it be capable of using web services and making SOAP or HTTP/IP protocol requests. The Endpoint Token can operate either plugged into a host device or wirelessly and can charge its battery either by being plugged into a host device or wirelessly through the use of RFID to trickle charge its battery.

In some embodiments, the Endpoint Token has the ability to run its own operating system and applications and these applications provide services accessible to outside entities. Additionally it has the ability to establish secure encrypted communications to its own Endpoint Token Management system. These communications occur through either Wi-Fi, Cellular mobile data, or bridged host device connections. The format for the messages is short burst packets sent when an Endpoint Token makes a connection to the Management System.

In some embodiments, the Endpoint Token Management system is an integral part of this invention as it creates the virtual token such that a backend application has access to all the Endpoint Tokens that have been distributed. The Management System creates a virtualized copy of the actual Endpoint Token and then synchronization is executed to send small data burst packets to the Endpoint Token to update it with the changed made to the virtual copy. This allows the changes to the Endpoint Token to be verified and tested before they are actually applied to the Endpoint Token in the field. This method of maintaining a virtual copy of the Endpoint Token allows for synchronization in both directions and happens as updates are passed in both directions. The synchronization may require the queuing of multiple messages both to and from the Endpoint Token. Additionally the Endpoint Token may not connect on a regular basis and as such any updates may only be partially passed between the Management System and the Endpoint Token. Also there could be long periods of time between Token connections and as such some changes may take some time to complete and this may lead to changes being superseded by later changes. As such an extensive queuing system exists within the Management System to ensure any updates desired for the Endpoint Token are managed and verified.

In some embodiments, the Management System also takes care of monitoring the status of Endpoint Tokens and any software or operating system updates that may need to be distributed to the Endpoint Tokens.

In one embodiment of this invention, a thin multi-layer circuit board with mounted components (microprocessor, memory, secure storage, cellular module, Bluetooth module, RFID module, USB module, and battery) is included in the system. In some embodiments, the board and its components would then be encased in a tamper proof coating that if exposed to air would destroy primarily the memory, but also at least damage the other components rendering the Endpoint Token clean and without data. The casing around this coated board would be possibly made of plastic or some form of composite and the form factor for all of this could take the shape of a Credit Card, a USB Dongle, or a Disc. Other form factors are possible and may be included by one of skill in the art.

In some embodiments, the operation of the Endpoint Token is dynamic and capable of being remotely programmed from the Management System. The battery is capable of being charged from either a direct USB connection to a host device or USB electrical source as well as being in the proximity of a RFID scanner that would broadcast a radio frequency which in turn would energize the antenna and provide a low power trickle charge to the battery.

In some embodiments, the Endpoint Token is capable of interfacing with devices such as PCs and other computing machines and can connect either directly through a USB port or wirelessly through Bluetooth or Wi-Fi. This connection allows for access to the web server that runs on the Endpoint Token. This web server can provide controlled and secured access to programmed features of the Token. Additionally web services can be programmed and made accessible from the Endpoint Token thus allowing software on the PC to directly connect to the Token and perform functions that are provided and programmed through such an interface.

Figure 5:
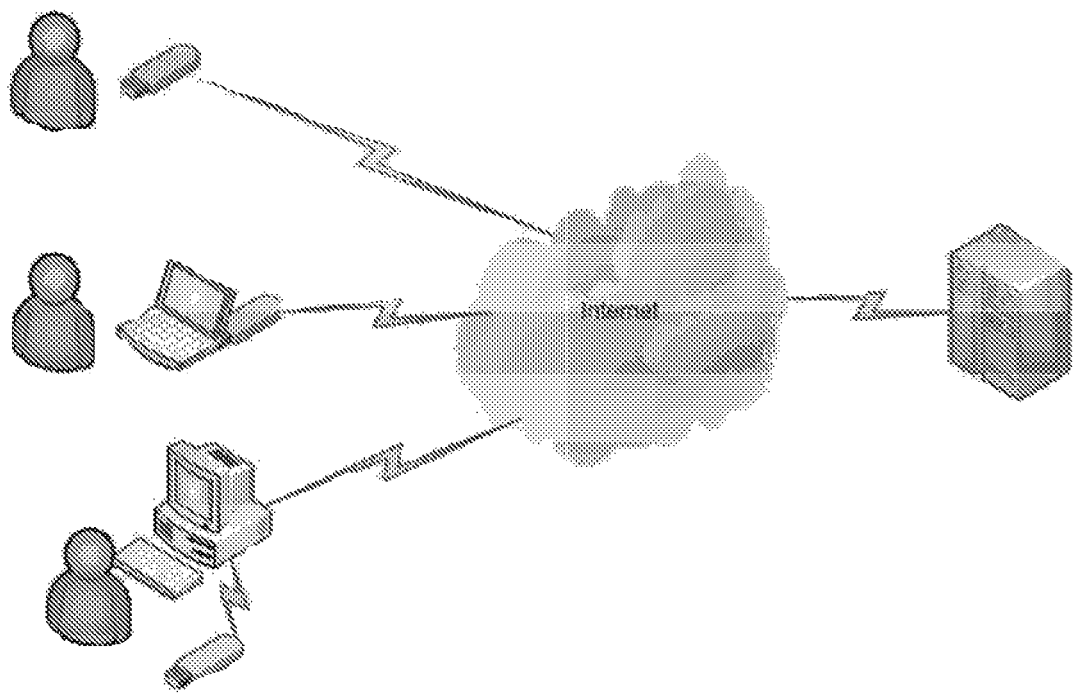
FIG. 5 is a block diagram depicting different methods of communicating between presently disclosed systems via the internet.

In some embodiments, the Endpoint Token also can connect with the Endpoint Token Management System and this can occur one of three ways as shown in FIG. 5. First is as a standalone device making a connection through its built-in cellular modem that allows access when there is power and when signal is available. Additionally if the Token is near a known Wi-Fi hotspot it can connect using Wi-Fi. The second method is as a direct USB connection to a device such as a PC where the USB connection is then bridged to the Internet connection for that PC. The third method is to connect to a device wirelessly and then seek to bridge that devices Internet connection. This wireless connection can happen over Bluetooth, Wi-Fi, or any possible future communications methods that could be incorporated into the design.

In some embodiments, a connection by the Endpoint Token to the Endpoint Token Management system is critical to its function as it provides the means by which data on the Token is updated, applications available on the Token are updated, and certain periodic housekeeping is done between the Token and the Management system in order to ensure continued synchronization. These communications are periodic and unpredictable since it cannot be known when the Endpoint Token will have access to the Internet or for how long. This can be due to a lack of power, inaccessible signal, or any of a number of reasons. When the Token does connect, for these embodiments it is a requirement that the Management system send as manage packets down to the Token and the Token send up to the Management system as well. This requires a queue method such that both the Token and the Management system queue packets to be sent between them and those packets require sequencing to ensure complete synchronization actions are executed when all data is present for a given action. This queue mechanism is useful for staging multiple changes to ensuring a single complete change is sent before the next one.

In some embodiments, the communications between the Token and the Management system are encrypted and this can be as simple as SSL or as complex as our proprietary Dynamic and Random Encryption method. The Token microprocessor has a cryptographic ability and additionally a cryptographic module that could be incorporated into the existing design as well if needed.

In some embodiments, the Endpoint Token Management system maintains an almost complete copy of the Endpoint Token in the field. This copy is only almost complete because there is a section of the Token which is considered protected storage and as such is not known to the Management system. This allows for Keys to be stored that are desired to remain unknown as well as possibly passwords and other credentials that the holder of the Endpoint Token wishes to protect. The rest of the Token does exist in different forms with the Management System.

The basic operating system image for the Token, otherwise known as the ROM, is maintained as a single version for all Tokens. The Token Controller program is the base application that allows access to the other applications installed on the Token. It handles the setup and housekeeping for the other applications and maintains the synchronization between the Token and the Management system from the side of the Token. As with the operating system, the Token Controller is maintained as a single copy for all Tokens.

In some embodiments, the individual applications are divided into two parts; one for the actual programs that make up the application and the other is the data the application then uses. Application in the context of this Token could be as simple as a single program or as complex as multiple linked programs that then handle requests from outside the Token originating through the Web Service ports. The Web Service ports may be provided through the web server built-in to the Token and that is part of the operating system. The applications programs may change and need to be updated only occasionally and as such would be treated separately. The data for the applications is expected to be a continuous update and due to changes based on the nature of a given application. If the application pertained to software licensing, as an example, then the data would change whenever a new license was bought, it would change if the license were renewed or loaned, and it would change whenever a license expired.

In some embodiments, the Management System maintains the synchronization of these changes to the Endpoint Token and also provides the means by which to verify the correctness of a change before it is implemented to the Token. Since the Virtual Endpoint Token is an almost exact copy a simulated operating system is available to test any changes prior to them going to the Token itself. This prevents a change from being implemented that might render the Token unusable.

On the other side of the Virtual Endpoint Tokens are the Application Interface processes that provide the mechanism by which to allow outside applications, possibly running on remote Servers, to send changes to data that need to be processed for a given Endpoint Token. This provides the mechanism by which the Management System can interface and support another application and thus attach the Endpoint Tokens to that other application in a seamless manner.

The overall design of this technology makes it practical and simple to include a secure Endpoint Token device as part of an overall application and services design.

Embodiments of the endpoint approach will access the management system in the background, without the need of user intervention. It may use the internet and pass encrypted messages back and forth to the management system. While embodiments might use a cellular modem to facilitate such messaging, it will not necessarily be using the same method or function as they describe.

Lastly, while embodiments may use the HTTP/IP protocol, it may be very differently approached from conventional methods. The present approach may be a web service, rather than as a mere provider or web pages. The HTTP/IP protocol is one possible means to communicate the data, but SOAP is another protocol. All of these web protocols are common and used by multiple products. As such they should not constitute a unique component for any technology. The function and use of it in the present approach will be vastly different from conventional means.

In some embodiments, the endpoint can function independently of any network. In some embodiments, the present system has a microprocessor, memory, a USB connection, cryptographic capability, and the ability to run its own applications; it does not interface with external applications. Rather, the system of the present invention runs applications in the background handling its own housekeeping, database, encryption, streaming, web services, and web server. In some embodiments, the secure endpoint device has its own small screen on which information can be displayed and its own input hardware to allow user interaction. The secure endpoint can run standalone and has its own data communications channels to the internet.

In some embodiments, the present invention is able to function in a standalone mode and does not require another device to facilitate data communications or the execution of software to facilitate the verification and accessibility of the data.

In some embodiments, the present system uses RFID as a means to trickle charge a battery or other power source. In some embodiments, a touchscreen LCD or a regular LCD with navigation buttons may be included.

Dynamic Random Encryption

In some embodiments, a system is provided with strong encryption incorporating the least amount of data required to be pre-shared. In some embodiments, the encrypted data is self-contained and does not require any synchronization of processing such as independent calculations by the entity performing the encryption that would also need to be done by the entity performing the decryption. This could lead to a mismatch of data that would leave the data unable to be decrypted.

In some embodiments, the present system includes the ability to run on the smallest platform such as a smart chip, smart card or microprocessor. In some embodiments, it has minimal memory requirements and is adaptable to what encryption algorithms might be present on any given platform.

In some embodiments, the system and method of encryption change with hardware, software, and encryption standards. As more powerful hardware arrives, the system method can still be used, adapts and remains current even when a new encryption algorithm becomes the industry standard.

In some embodiments, the system uses a multidimensional table of random data that grows and changes with each use, whether for encryption or decryption. This table of random data has no meaning until it has one applied to provide data for a given encryption function. At the time of encryption the table is searched to find a location of a given value that can be used to satisfy the need for a given encryption parameter. If one is not found then the table can be altered to create one.

The semaphore encoding commands are merely labels for specific functions. These labels can be changed using semaphore commands. As such the semaphore encoding is random and dynamic and constantly changing.

In some embodiments, the system can support any encryption method that can be reduced to computer instructions. Additionally it is scalable and can be used to pass keys of varying and extremely large lengths.

The encrypted data coupled with the semaphore encoding for that encrypted data may be self-contained. In some embodiments, the system may use a semaphore encoding that has the means to self-correct when either data has been lost or failed to be processed leaving the multidimensional tables out of synchronization. Embodiments include a method of data encryption in which the encryption algorithm, the encryption parameters needed for a given encryption algorithm, if a key is needed for the given algorithm, even the key itself, and other commands to alter data and even alter the commands themselves is passed using an indirect semaphore of commands to manipulate a multi-dimensional table as well as the command structure data. The initial state of the multidimensional table having been shared between entities to establish encryption. An encryption algorithm can be any programmable cipher including, but not limited to, DES, RSA, AES, Blowfish, etc.

In another embodiment, a method is provided where encryption parameters refers to any data needed as input to either encrypt or decrypt with the given encryption algorithm.

In another embodiment, a method is provided where indirect semaphore refers to a command language that encodes a set of actions to take in discerning the encryption algorithm used, the encryption parameters used with that algorithm, and other commands to alter data and/or commands themselves to maintain synchronicity between encryption and decryption of the data.

In another embodiment, a method where multi-dimensional table refers to a form of data in which there are multiple layers of data that are manipulated and used when executing semaphore commands. The data contained is random and has no specific order or pattern.

In another embodiment, a method is provided where the semaphore command language includes a command to frame or format the multidimensional table using a given geometric shape.

In another embodiment, a method is provided where the semaphore command language includes a command to specify the encryption algorithm to use.

In another embodiment, a method is provided where the semaphore command language includes commands to provide the necessary parameters for a given encryption algorithm.

In another embodiment, a method is provided where the semaphore command language includes commands to alter data in the multidimensional table. These commands can alter the entire table or just specific locations or groups of locations. The type of alteration can be replacement of data, movement of data, application of a specific algorithm, or other specified adjustments to the data.

In another embodiment, a method is provided where the semaphore command language includes commands to alter the semaphore that represents a given command. Semaphore commands themselves can be altered to maintain synchronicity between encryption and decryption.

In another embodiment, a method is provided where encryption begins with the use of some form of pseudo-random number generation for the selection and construction of commands in the semaphore encoding that will be used to set up the encryption.

In another embodiment, a method is provided where the construction of commands uses the existing multidimensional table to find the data needed for the desired encryption algorithm while also utilizing fuzzy logic to alter and organically grow the multidimensional table.

In another embodiment, a method is provided where the resulting semaphore encoding is then used to setup and prepare the necessary data to encrypt the data wishing to be kept secret.

In another embodiment, a method is provided where decryption begins with the processing and execution of the semaphore commands using the already existing multidimensional table.

In another embodiment, a method is provided where the given semaphore commands will be executed and the encryption algorithm and parameters will be setup in preparation for decryption.

In another embodiment, a method is provided where the data appended to the semaphore commands will be decrypted using the algorithm and parameters configured previously.

In another embodiment, a method is provided where the semaphore commands may alter the data contained within the multidimensional table that already exists.

In another embodiment, a method is provided where a semaphore command may alter a given semaphore command thus changing the semaphore command identifier for a given function.

In another embodiment, a method is provided where a semaphore command exists that will reset the multidimensional table to its last saved point thus creating a reset of sorts for the multidimensional table.

In another embodiment, a method is provided where a semaphore command exists that provides for the saving of the current state of the multidimensional table.

In another embodiment, a method is provided where a semaphore command exists that provides for the restoring of the original identifier for a given semaphore command thus resetting it to its original value.

In another embodiment, a method is provided where a semaphore command exists that provides for verification of execution of a given set of semaphore commands.

In another embodiment, a method is provided that contains a semaphore command for implementing new encryption algorithmic instructions thus adding a new encryption algorithm that can be used to encrypt data.

In another embodiment, a method is provided that allows for the alteration of the semaphore encoding format to provide for the appearance of random values, pad values, alterations in the length of values associated with a given semaphore encoding command.

Figure 6:
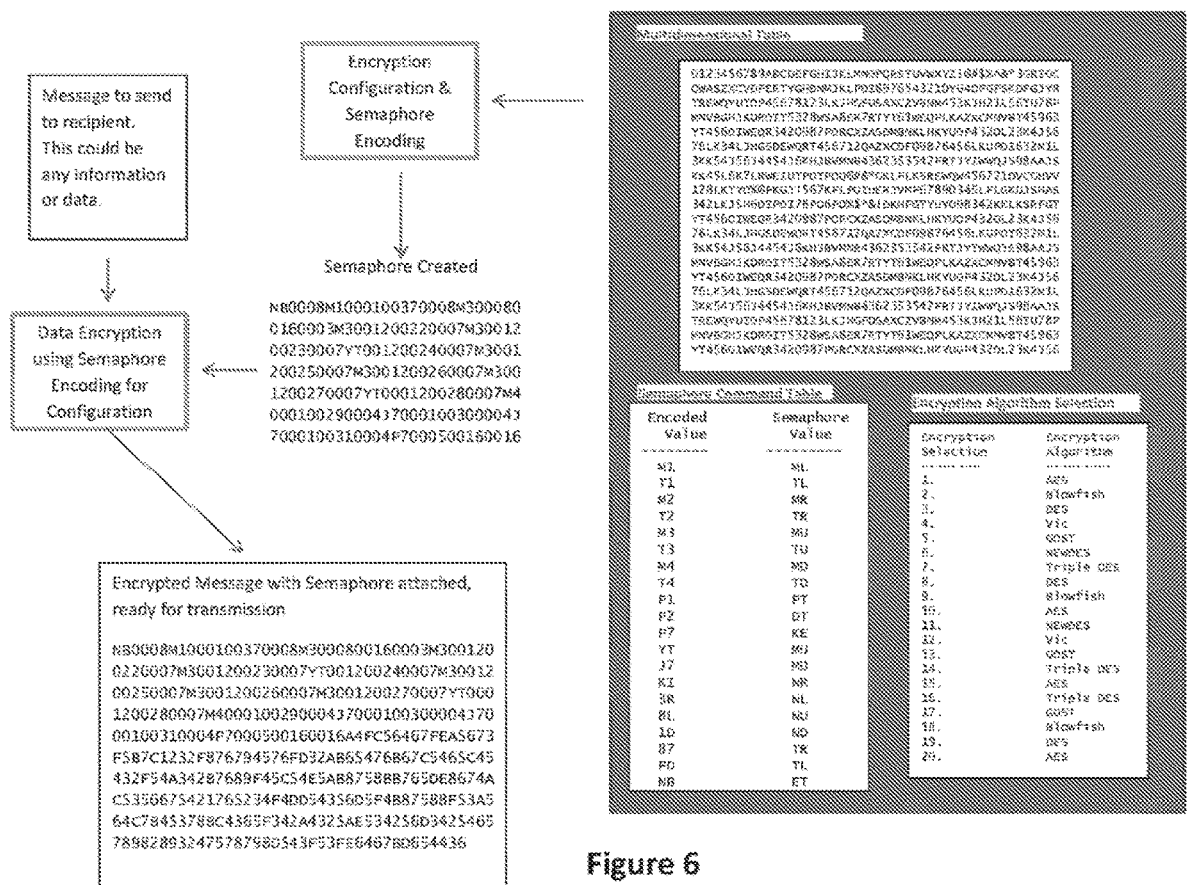
FIG. 6 is a block diagram illustrating an exemplary embodiment of the presently disclosed encryption method that may be implemented on presently disclosed systems.

For example, FIG. 6 illustrates in a broad sense one method of encryption according to one or more embodiments of the present invention. One embodiment for the present system and method includes a transmission of encrypted messages between two parties. The initiation of the process that is used to implement this method of encryption is the Encryption Configuration. This represents the creation of the necessary choices for the encryption algorithm that will be used, the parameters for the specific algorithm, the values to use for those parameters, and the semaphore encoded commands to specify those values in the multidimensional table. First the encryption algorithm is selected using a pseudo-random number generation algorithm. This provides a number used to select from the table of possible encryption algorithm choices. Once the encryption algorithm is known the parameters needed for that algorithm are built and the value for each parameter is selected from the multidimensional table. The values for these parameters are using either a method of extracting values from the multidimensional table as it is currently defined, shifting data around in the multidimensional table until the value desired is created, or some combination of the two. These methods allow the multidimensional table to change and evolve over time.

In some embodiments, once the semaphore encoding for the selected encryption method and its parameters is created, it is then passed to another step where it is used to configure the encryption activity. The encryption type determines the software and/or possibly encryption hardware that is/are accessed to carry out the encryption algorithm that was selected. The parameters are passed along with the clear text data and the encryption occurs. At this step additional semaphore encoding could be inserted to provider for further changes to the multidimensional table, to alter semaphore encodings, or to alter encryption algorithms. When complete the encrypted data is appended to the semaphore encoding and the message is ready for transmission.

Figure 7:
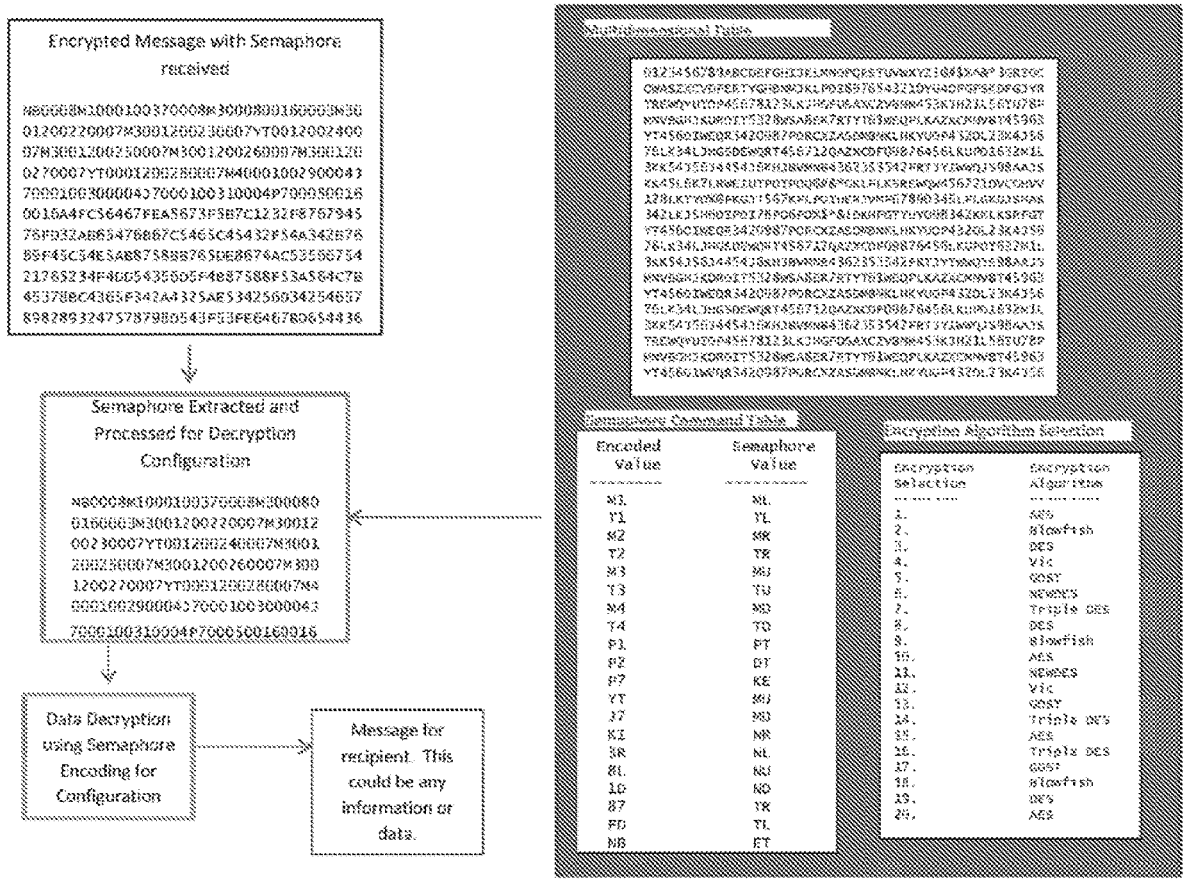
FIG. 7 is a block diagram illustrating an exemplary embodiment of the presently disclosed decryption method that may be implemented on presently disclosed systems.

FIG. 7 illustrates in a broad sense one method and system of decryption used by the entity receiving the encrypted message created above according to an exemplary embodiment of the present disclosure. When the message is received the first step is to extract the semaphore encoding from the encrypted data. This is done using a semaphore encoded command that indicates the termination of the semaphore encoding. After the semaphore encoding is extracted it is passed to a decryption configuration step where the semaphore values are interpreted to determine the type of encryption, the parameter values used and any modifications to the multidimensional table that are part of those parameter extractions, and any other semaphore commands that may need to be processed. Once the decryption configuration is complete, the encryption type determines to where the configuration is passed to process the decryption activity. Along with the decryption configuration the encrypted data is passed and decryption occurs. The decrypted data is then ready for use.

In FIGS. 8A-8E examples of the geometric shapes that can be used to overlay the data in the multidimensional table in order to further increase the complexity of the evolution of the table as it is modified and used. For example, FIG. 8A presents an exemplary octahedron, FIG. 8B an exemplary tetrahedron, FIG. 8C an exemplary icosahedron, FIG. 8D an exemplary dodecahedron, and FIG. 8E an exemplary cube or hexahedron. Each side of these shapes would contain data and the data would be constrained by the shape such that it would be limited by the space available on each side of the shape. For instance a triangle would have only enough space in the first row of a given side to store a single data item while the bottom row would be the full width with the maximum number of data items.

FIG. 9 is a drawing is an example of a given level of the multidimensional table showing how the data would appear inside the table. There is no structure or pattern to the data and it is fluid constantly evolving with each use. The multidimensional table has n-dimensions and can be configured to any level including super-dimensional outside the bounds of normal geometric shapes. This allows for further complexity and the ability to scale as needed.

Figure 10:
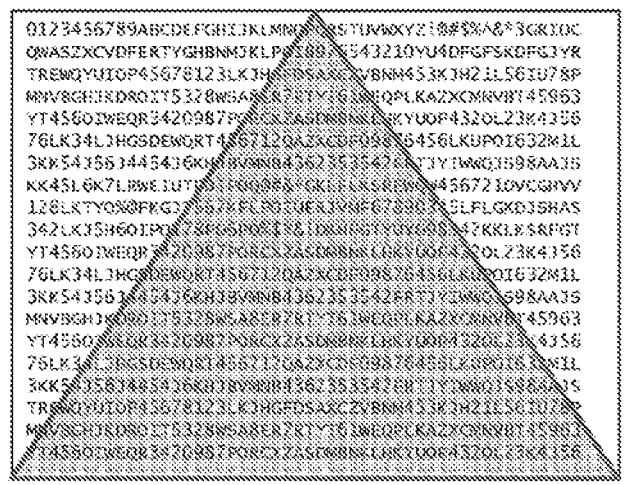
FIG. 10 is an example of how a given side of a geometric shape could be applied to a multidimensional table and how it could constrain access to the data in the table in certain exemplary aspects of the present disclosure.

FIG. 10 is an example of how a given side of a geometric shape would be applied to the multidimensional table and how it would constrain access to the data in the table. Here the first row is constrained to a single data item while the bottom row is full and complete. In this example a single side is shown with a triangle overlaid, if this were a pyramid than there would be three additional sides and a full size bottom to accompany it.

In FIG. 11 an example of a given side for one of the nested dimensions referenced in the multi-dimensional table is shown. FIG. 11 shows how navigation would occur to arrive at a given data item and how this data items could then be used to build a given parameter. In this example row 8 column 17 for a length of 1 is the first value. This is followed by row 5 column 17 for a length of 5 is the second value. Then row 15 column 29 for a length of 7 is the third value. Finally row 1 column 37 for a length of 3 is the last value. When all of these values are extracted in order and concatenated together to form the parameter it appears as; "745671F0987644DF". This value could be used as a key parameter for DES encryption. When this method completes the table is still in the same form as it was at the beginning and no modifications have occurred.

Figure 12:
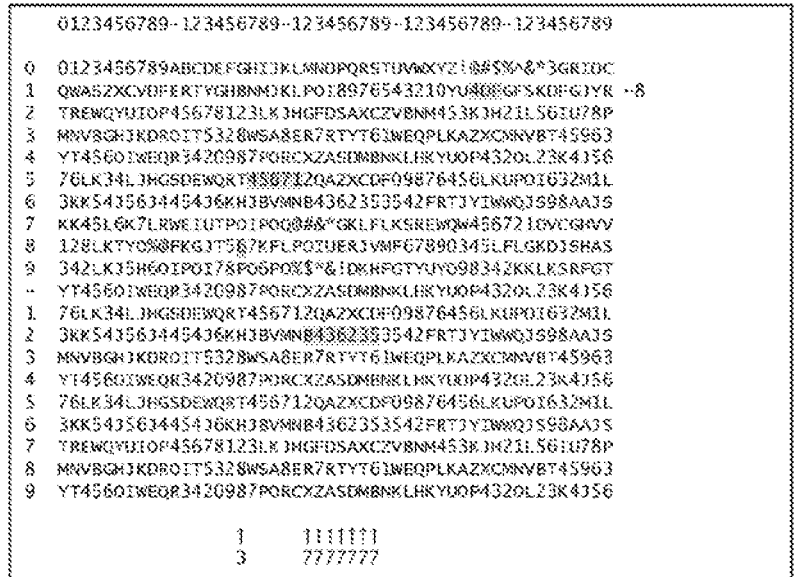
FIG. 12 illustrates an exemplary first step in extracting a value using the table modification process according to certain aspects of the present disclosure.

FIG. 12 shows the first step in extracting a value using the table modification process. This method alters the multidimensional table contents by moving them and then at the end extracts a parameter value as one action instead of having to build it from pieces. A move consists of rotating the values in the column. When a value is rotated from the last position in the direction of the rotation it rotates around to the first position thus making it is a complete rotation of either a column or row. In this the first figure for this method there are three separate moves taking place. First column 17 is moved up 3 positions. Then columns 22 thru 28 are rotated up 7 positions. Lastly row 1 is rotated left 8 positions.

FIG. 12A shows the next set of moves for the method started above. In this figure, columns 29 thru 31 are rotated down 4 positions.

FIG. 12B shows the value that was created by the moves and that is now ready to be extracted and used. It is highlighted and exists in row 5 beginning in column 16 and ending in column 31.

FIG. 13 shows an example of applying an algorithmic change to the table as the means of modification. In this example a semaphore encoded command has been executed to modify row 11 in its entirety. The algorithmic command was to increment the values in this row by one. As such 1 became 2, A became B, and so on. This is just another example of how the multidimensional table can evolve and grow organically thus keeping it random and unpredictable to an outside observer.

Persistent Software Integrity

As will be appreciated by one of skill in the art, aspects or portions of the present approach may be embodied as a method, system, and at least in part, on a computer readable medium. Accordingly, the present approach may take the form of combination of hardware and software embodiments (including firmware, resident software, micro-code, etc.) or an embodiment combining software and hardware aspects that may all generally be referred to herein as a "circuit," "module" or "system." Furthermore, the present approach may take the form of a computer program product on a computer readable medium having computer-usable program code embodied in the medium. The present approach might also take the form of a combination of such a computer program product with one or more devices, such as a modular sensor brick, systems relating to communications, control, an integrate remote control component, etc.

Any suitable non-transient computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the non-transient computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a device accessed via a network, such as the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any non-transient medium that can contain, store, communicate, propagate, or transport the program for use by or in connection with the instruction execution system, apparatus, or device.

Computer program code for carrying out operations of the present approach may be written in an object oriented programming language such as Java, C++, etc. However, the computer program code for carrying out operations of the present approach may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present approach is described below with reference to flowchart illustrations and/or block diagrams of methods, apparatus (systems) and computer program products according to embodiments of the approach. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable memory, including a networked or cloud accessible memory, that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to specially configure it to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present approach may be presented and responded to via a graphical user interface (GUI) presented on the display of the mobile communications device or the like. Prompts may also be audible, vibrating, etc.

Any flowcharts and block diagrams in the Figures illustrate the architecture, functionality, and operation of possible implementations of systems, methods and computer program products according to various embodiments of the present approach. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The first step to securing the placement of license verification functions in any application is where they are placed and how they will function where they are place in a given application. This requires information about the application; object files, graphic files, configuration files, subdirectories, libraries, and structure. These things are like the DNA of the application and make up its overall fingerprint that is unique and specific to a given application. A manifest of sorts is needed, one that shows the files, the code entry and exit points for each object file, and the files sizes and their calculated digital signature.

Armed with this information it is possible to embed the license verification logic and do so very deep within the application. But while this may aid in maintaining the logic within the application, it is still possible through a diligent effort to remove the logic. This requires another layer of protection that is outside of and away from the license verification logic. The present disclosure provides both embedded logic within and outside the application. The purpose of this logic is to protect and maintain the embedded license verification logic. This logic is hidden even more so than the license verification and may in fact be almost Stealth Execution-like in it execution. It facilitates the movement and re-embedding of the license logic in order to create a sort of moving target. It makes the embedded logic a target so dynamic that it makes finding all of the license verification logic extremely difficult if not impossible. In some embodiments, this is done by periodically randomizing the location of the license verification logic within the application.

In addition, the logic that moves the license verification logic is hidden and is both inside and outside the application so that it is impossible to find and eradicate. This outside location for embedding the logic must be carefully chosen so as to not interfere with the operation of the host PC and any other applications. In some embodiments, this method of license verification, embedded verification logic, and logic to maintain the verification logic is dynamic and much more difficult to remove thus making it a good defense for protecting the intellectual property while giving free and easy access to the owner or user of the intellectual property.

One primary embodiment of the present invention includes the ability to provide a software application, method and system by which to securely connect a piece of protected software asset or intellectual property such as a software application to a licensing control system. Additionally, the present embodiments ensure that this connection cannot be broken. In some embodiments, this requires making the connection between the license verification and the application one that is less static and more dynamic. In some embodiments, the connection has to move and change over time and it has to contain multiple parts such that there is no single point of failure that could then result in the licensing being disabled or removed.

In order to achieve the goals of the present invention according to some embodiments, there are generally two parts. First is the DNA Scan that is intended to dissect and explore an application looking for places that would be best for embedding logic. This scan includes all object files, libraries, icon graphics files, general graphics files, subdirectory structure, and configuration files that make up a given application. The logic for license verification as well as the logic for maintaining license verification, hereon called the logic, can be embedded in any object files by use of the entry and exit points for those files. These entry and exit points are found through a detailed scan of each object file. Additionally the logic can also be embedded into graphics files as well and would be executed whenever the graphic the file represents is displayed. All of this information is derived as part of the DNA Scan.

The second part is the need to maintain the embedded logic and to ensure it can't be easily removed, if removed at all. This is done using the same techniques that are employed by those who create computer Stealth Execution. The concept used is of hiding and moving around such that a random moving target becomes difficult to eradicate. This movement is for both the license verification logic as well as this logic to maintain it. Each time this logic is executed a choice will be made based on pseudo-random generated values of what to move and where to move it within the application. This movement and replacement of embedded code creates a difficult picture to obtain of how the embedded code actually appears. In the past any embedded code for licensing was static and no matter how well hidden would eventually be found and targeted by those wishing to remove or disable it. In this invention the concept is to move the code around, to make it difficult to locate and impossible to identify. These concepts together create a difficult, if not impossible, connection to break between the license verification and the application being licensed.

Figure 14:
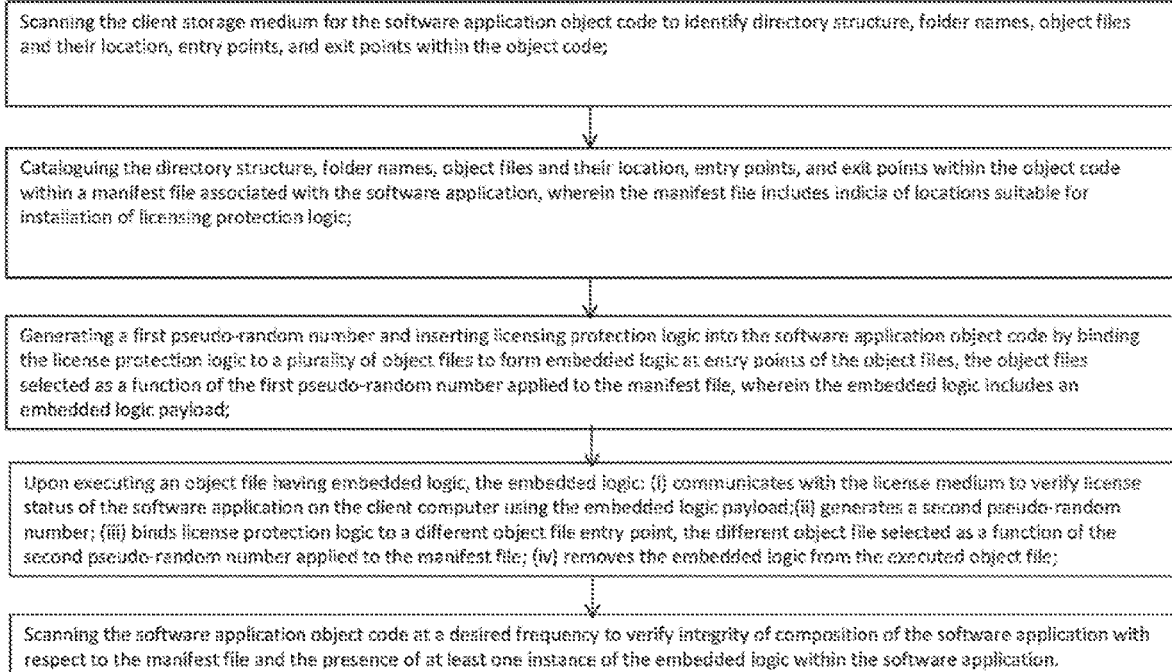
FIG. 14 is a flow chart illustrating certain method steps for scanning and verifying the integrity of a software system according to certain aspects of the present disclosure.

In some embodiments, the endpoint token management system first introduced above, or alternatively an independent application, may include a license storage medium storing programming code for executing a license management method. In some embodiments, and referring now to FIG. 14, the method may include scanning the client storage medium for the software application object code to identify directory structure, folder names, object files and their location, entry points, and exit points within the object code. Then, the system may catalogue the directory structure, folder names, object files and their location, entry points, and exit points within the object code within a manifest file associated with the software application, wherein the manifest file includes indicia of locations suitable for installation of licensing protection logic. The system may also generate a first pseudo-random number (using for example one or more pseudo-random number generators that may be themselves randomly selected) and inserting licensing protection logic into the software application object code by binding the license protection logic to a plurality of object files to form embedded logic at entry points of the object files, the object files selected as a function of the first pseudo-random number applied to the manifest file, wherein the embedded logic includes an embedded logic payload.

Upon executing an object file having embedded logic, the embedded logic may then communicate with the license medium to verify license status of the software application on the client computer using the embedded logic payload; generate a second pseudo-random number; bind license protection logic to a different object file entry point, the different object file selected as a function of the second pseudo-random number applied to the manifest file; and remove the embedded logic from the executed object file. the software application object code may then be scanned at a desired frequency to verify integrity of composition of the software application with respect to the manifest file and the presence of at least one instance of the embedded logic within the software application.

In some embodiments, the present invention involves some calculation of hash values, but does not use these values to verify execution of the application. Instead, some embodiments of the present invention calculates hashes as a secondary check and instead scans the application files for entry points where additional code that would execute a method of verification using an outside source such as a Token. In some embodiments, the hashes are a secondary check to verify the source of a key request and we are not using certificates other than for security of the digital signatures we use to very an application license.

In some embodiments, the present invention scans through program object code looking for points where code can be inserted to provide a given function such as license verification, program configuration verification, and other functions as needed.

In some embodiments, the present invention intends to insert tamper resistant code into the source code of an application prior to it being used to generate the object that runs as the application. This tamper resistant code is intended to secure the application and to prevent it from being altered or from being attacked externally once the object files are created and executed as part of the application. In some embodiments, the present invention discloses using a compiler step to scan for locations where these tamper resistant instructions can be placed in the source code. In some embodiments, the object code for machine language indicates places where separately executed instructions to verify a license can be inserted. Additionally, the present invention analyzes in total looking for places that logic can be inserted for the Persistent Software Integrity feature. The functions of these scans are completely different as are what files are being scanned and for what reason they are being scanned.

In some embodiments, the present invention discloses a method for determining if a program that is protected using a protective envelope has had an envelope broken in order to render its license protections inoperable.

In some embodiments, the present invention scans object files looking for program entry points where object instructions could be inserted for license verification.

In some embodiments, the present invention scans for entry and exit points within each object file comprising an application. In some embodiments, the present invention is performing a vulnerability scan in the sense that it is looking for places where code could be inserted and hidden much like a computer Stealth Execution would do when infecting a program. The intent of this code is to actually infect the application to be protected such that both the license verification code is hidden within the object files, but also the very code to maintain this infection is also hidden both in the object files of the application, but also within the structure of the application when installed on a PC within that PC such that the application is able to be protected and the license verified.

In some embodiments, the present invention discloses the use of a dongle or license container. It also does discuss code inserted into the application, whether for monitoring and detection of threats to the application being protected or as bait code to lure attackers to code that in reality just signals an attack is in process. In some embodiments, the present invention first scans an application looking for locations where the license verification logic can be inserted. It then infects the application with this logic as well as the logic to persist its continued existence in the application. Effectively our invention acts in a Stealth Execution-like fashion to protect the application in a manner similar to that which would be employed by those who would attempt to attack and application in order to disable any licensing and to make the application license free. Our invention infects both the application object files and also the application's file structure. Additionally when installed, the present invention infects the platform on which it will be used in order to monitor any attempts to remove the license logic that was inserted.

In some embodiments, the present invention is scanning source code looking for patterns that help it to identify if the source code in question is open source or a licensed piece of source code or source code that uses licensed code. In some embodiments, the present invention scans object files and inserts code into object files just as this invention does something similar. In some embodiments, the present invention scants to secure discovered security vulnerabilities it finds in the code. The present invention is inserting code at entry points where it will be executed to verify a license and to ensure persistence of the license verification code.

Preferred embodiments may include one or more of performing a scan of object files for a given application to seek entry and exit points as a means to determine locations for embedding logic, performing scans of all files and subdirectory structures for a given application in order to identify additional locations where logic can be embedded, identifying areas of the operating system on which the application will be installed where additional logic could safely be embedded during the installation process, creating a database of the findings from the DNA Scan to store for use in configuring the embedded logic, creating embedded logic specific to a given application such that it will use the best methods for embedding and maintaining the logic for the given application, using logic that can move machine level code contained within both object files and graphics files for a given application, using logic capable of Stealth Execution like abilities to hide and embed itself throughout the application, creating multiple versions of the same license verification code with each using a different set of computer instructions or a different combination of the same instructions in order to create a different appearance and checksum for the code being embedded, conveying the embedded code into a copy of the application where either some or all of the originally embedded logic has either been damaged, disabled, or removed, the logic maintaining the license verification logic to function with a given license verification method payload thus making this invention agnostic in terms of the license verification method being used, the logic using various hashes or checksums to verify the integrity of embedded code to ascertain if an attack has been attempted and if that embedded logic has been removed or damaged, the logic self-maintaining and self-repairing such that even if the entire embedded logic were removed from the application itself an outside iteration of the embedded logic could completely re-establish the embedded logic and re-secure the application.

A system according to one or more embodiments may include the ability to scan object files for entry and exit points in the code where external logic could be inserted, ability to scan directory structures looking for locations where external logic could be inserted in the form of dummy files, ability to scan graphics files for points where external logic could be inserted, a database component that allows for the storage of the information gathered from these scans, ability to reduce and compress the list of locations, both within object files and also other places, such that said list can be embedded as part of logic for their use, ability to accept a logic payload that will be embedded into an application; ability to use a list of locations where this payload can be embedded and the method to use for embedding, ability to use stealth methods of embedding to secure its own embedding within an application, ability to initiate a background process to facilitate the movement of embedded logic, ability to reinstall itself from remote or other locations in case of damage or removal of the embedded copy, and ability to signal a remote host in case of attack, damage, or removal.

In yet other embodiments, a license management system for deployment within a computer network for the secure control of a software application within the network is provided. The license management system may include, for example, a computer network having at least one client computer processor and client storage medium, at least one license computer processor and a license storage medium. The software application may be installed on the client storage medium and the license computer processor may be configured by computer program code installed on the license storage medium for performing certain steps.

For example, and referring once again generally to FIG. 14, the license management system according to one embodiment may scan the client storage medium for the software application object code to identify directory structure, folder names, object files and their location, entry points, and exit points within the object code. The system may then catalogue the directory structure, folder names, object files and their location, entry points, and exit points within the object code within a manifest file associated with the software application, wherein the manifest file includes indicia of locations suitable for installation of licensing protection logic. A first pseudo-random number may then be generated and license protection logic may be inserted into the software application object code by binding the license protection logic to a plurality of object files to form embedded logic at entry points of the object files, the object files selected as a function of the first pseudo-random number applied to the manifest file, wherein the embedded logic includes an embedded logic payload. In some embodiments, upon executing an object file having embedded logic, the embedded logic may communicate with the license medium to verify license status of the software application on the client computer using the embedded logic payload, generate a second pseudo-random number, bind license protection logic to a different object file entry point, the different object file selected as a function of the second pseudo-random number applied to the manifest file, and then the system may scan the software application object code at a desired frequency to verify integrity of composition of the software application with respect to the manifest file and the presence of at least one instance of the embedded logic within the software application.

The following terms may be applicable in one or more of present embodiments:

Logic—This is machine level code for a set of computer instructions. It is created from compiling computer instructions from source code into object code.

Embedded Logic Payload—This is the logic that is intended to be embedded into an application and then maintained as part of that application by this invention.

Embedded Logic—This is the logic for this invention that carries and embeds the logic payload and then maintains it as part of the application. This logic also maintains itself as part of the application to ensure protections for the logic payload.

Embedding Logic—This is done by binding the logic payload to another object file or by creating a dummy standalone file that will execute the logic payload or the logic itself. It is a means by which the external logic is incorporated into the application.

Entry and Exit Points—These are the places within an object file where the execution is either entering or leaving a section of code and where an additional execution step can be added to execute embedded logic.

Graphics Files—These are the files within an application that are used to display icons, backgrounds, or themes for that application. Since they are usually in one of the standard graphics file formats it is possible to embed logic within them that is executed each time the graphic is displayed.

License Verification—This is code intended to provide some form of authentication and verification of the validity of a license for software. It can be either as simple as the verification of a code within a file or as complex as communications with a hardware device that provides messaging for carrying out the actual verification.

Directory Structure—This is the folder and tree structure for how the files that makeup an application are organized. It can provide locations where a dummy file could be used and embedded to provide safe storage for the logic and payload logic as well as a convention based on the structure to create additional dummy folders for the same purpose.

Persistent Software Integrity—This is the name given to one or more embodiments of the present invention.

Stealth Execution—Software instructions or code that moves machine instructions around within the object files of an application and that may propagate and sustain itself within the application using such methods. Such instructions may have the ability to resist removal and can self-heal when attempts are made to remove them.

In some embodiments, the first step in setting up an application to use Persistent Software Integrity is to identify the method best suited for "infecting" the application. This is done by first performing a DNA Scan to obtain the "DNA" of the application in order to identify weak points which could be exploited to provide safe harbor to the Persistent Software Integrity logic.

The first steps in the DNA Scan would be to identify the names and hierarchy of the directory structure used by the application. Each folder name and it position would be cataloged. Then each object file and its folder location would be cataloged. This would provide the processing list of object files that would then be scanned to identify all of the entry and exit points within the application. After each object file is scanned the data collected would be cataloged. At this point each file other than object files would be identified by type and based on a given criteria also identified if a candidate for embedded logic.

Once all of the scans are complete and the data is collected a listing will be generated of the locations, filename, entry and exit points, type of embedding, and any other pertinent data useful for embedding logic. This data will be encoded so as not to be readily readable to a normal observer. Additionally other configuration files may be created to be used in configuring the Persistent Software Integrity logic and make it customized for the application that was scanned.

The Persistent Software Integrity logic is built to embed both itself and its logic payload into an application based on the configuration generated above. When it is executed the first time it will immediately embed both itself and its payload logic into the application in multiple places based on pseudo-random number generation. This is done so that even in its initialized state before the application has even been installed the first time it is still not in a static state. Once the application is infected the intent of the Persistent Software Integrity logic is to maintain the infection and to move with the application as it moved from installation media to installed copy on a remote PC.

Once installed the Persistent Software Integrity logic begins to execute as the application is used. Each time it awakens due to a segment of its code being accessed it initiates a background process that begins the process of reshuffling where the embedded logic is located within the application. This method of constantly moving randomizes to the outside observer the appearance of the embedded code and makes it far more difficult to discover. If a person with the purpose of removing or disabling the logic begins to interfere or otherwise obstruct execution then the Persistent Software Integrity logic takes action. It restores what was disabled, moves it to another location, or alerts a remote host if an internet connection is available. Also if the target of the attack is the Persistent Software Integrity logic itself then it moves itself outside of the application to other locations and files on the PC thus making it even more difficult to find and eradicate.

In some embodiments, the software is able to scan an application and its associated programs and libraries to catalog entry points, calculate digital signatures, evaluate locations for placement of external software instructions, and create a valid manifest of the application for use in verifying its integrity. One or more of the following describes various detailed features of the present invention according to various embodiments.

Software DNA Scanning

In some embodiments, as part of the Persistent Software Integrity module a so-called DNA Scanner may be provided that scans the object code of an application that is desired to be protected regarding its licensing for use. The DNA Scanner may be what scans the application that is to be protected in order to catalog the directory structure, folder names, object files and their location, entry points, and exit points within the object code and then store this information within a manifest file associated with the software application. The scan may be done outside of normal processing and prior to use of the licensing software. The manifest file may then used by License Virus logic in order to know where it can place and move the embedded license logic within the protected application. This action by the License Virus logic is part of the normal processing flow.

In some embodiments, outside of normal process flow after the DNA Scan is performed and the manifest file is built, the application to be protected may be infected with the License Virus and the initial insertions of the embedded license logic take place into the protected application. This may occur outside of normal process flow and during normal process flow the License Virus then moves the embedded license logic around inserting into one location while deleting it from a previous location. In other words, the initial insertions of the Embedded License Logic may occur outside of normal processing just after the DNA Scan has completed. In certain other embodiments, however, other process flows may be utilized.

Catalog Entry Points: The scanning of an application, its programs and libraries, involves locating those points where the program makes jumps from one section of software instructions to another (an "entry point"). These locations are points in the software instructions where additional instructions could be inserted without affecting the execution of the application in general. During the scan these points will be catalogued and the software instructions on either side will be evaluated for frequency of execution and suitability for insertion of external software instructions for a given purpose.

Calculate Digital Signatures: Calculating digital signature is the process of calculating a mathematical sum that is unique for a given program. This is normally done by calculating a hash value on specific characteristics of the program. This value can then be used to digital sign an application, which can then be used in, but not limited to, a licensing system for Digital Rights Management.

Evaluate Placement of External Software Instructions: The results of the DNA Scan of the software would contain the entry points and other characteristics of the application that was scanned. This information would provide the necessary information for evaluating places in the application where external software instructions could be inserted. Some of these external software instructions could be used for license verification to ensure the integrity of the software for access by the license owner. Also some of these external software instructions could be to preserve the license verification software instructions code and prevent their removal by a rogue programmer trying to avoid license verification. Some of the software instructions used to prevent this removal could have software Stealth Execution characteristics in order to make their removal difficult or impossible. The DNA Scan would provide the information needed to cater these external software instructions to the given application that was scanned.

Create a Manifest of the Application Scanned for Use in Verifying Integrity: Another benefit of this scan is the creation of a manifest of the application scanned listing all the associated programs and libraries. This list could be used to verify the integrity of an application installed at a user location. This could be useful when a copy of a given application has issues functioning and there is a need to verify that rogue software instructions or libraries have not been introduced to the installation.

Viral Software Integrity

The viral software according to some embodiments of the present invention may be coupled with the information gathered from the DNA Scan to integrate an external software package into an existing software application. This provides the means by which to ensure the integrity of the application while also ensuring own survivability and persistence within the application software. Its primary purpose is the preservation and persistence of an integrated software package within the applications programs and libraries. It does this using certain viral characteristics that allow it to remain unseen within the application it is protecting while not interfering with the normal function of the machine on which it resides. Additionally it does not affect the operation of other software on the same platform and only affects and protects the application to which it was embedded. Below are some embodiments of the Viral Software Integrity.

Dynamic and Constantly Moving: In order to prevent detection and removal, the viral software will need to use the information from the DNA Scan to create a roadmap of locations to which it could move either itself or the package that was integrated into the application's programs and libraries. This constant moving and the nature of the multiple locations to which it could move creates a dynamic means by which to thwart attempts to remove it or the integrated package from the application software.

Periodic Persistence Check: Another level of protection may come from a periodic check of the integrated packages existence as well as the existence of copies of the software itself through a list of known locations that are verified. This periodic verification of persistence of both the integrated package and the viral software within the application software ensures that early detection can occur if a rogue programmer were attempting to remove either the integrated package or the viral software from the application software. This early detection would allow the viral software time to take evasive action in order to further obscure both its presence and that of the integrated package.

Remote Reintegration: If it were to occur that either the integrated package, the viral software, or both, were removed, it is possible for the viral software to be remotely reintegrated into the application software. This remote reintegration can occur by simply reinstalling the viral software into the applications program or libraries using buried copies of it that would be stored on the platform where the application software was installed during the installation process. Reintegration could occur such that if it were not possible for the viral software to re-enter the original locations without detection that it could reside external to the application software and in a worst case scenario where detection would occur and evasion was not possible it could be remotely triggered to self-destruct Notification of Removal Attempts: During attempts to remove the viral software and/or the integrated package it will happen that the viral software will have the ability to use any available internet connection to send messages to a central server. These messages would be alerts to the attempt at removal and if the problem were to persist it would be possible to self-destruct, rendering the application software useless.

Self-Destruct and Disabling of Application Software: In some embodiments, a Self-Destruct and Disabling feature would be a last means of ensuring integrity of the software application. It would be a function that would be triggered either by the viral software determining its immanent removal or through a remote command due to extreme attempts at removing or disabling the viral software. The self-destruct would disable and sabotage the application software to ensure its inability to function, requiring a complete uninstall and reinstall, which would the reintroduce the viral software and re-establish its ability to function. It would also plant copies of the viral software in hidden undisclosed locations on the platform where the application software had been installed. These copies would exist to monitor for attempts to re-establish the application software. If the application were to be revived then these hidden copies would reintegrate themselves into the application software and look for new opportunities to discover other locations to which it could move in order to create a robust protection scheme.

Public/Private Key Pair Encryption

In other embodiments of the present invention, a Public/Private Key Pair encryption system includes a Public Key that is used in unsecure environments to encrypt data only, and a Private Key that is used to decrypt data that has been encrypted using the Public Key. A Key Pair is usually generated using a passphrase that is user generated and can be of any length or data composition. Where the entity accessing data that was encrypted using the key pair is an application or program executable (both, known as a "Requestor"), the private key would have to be embedded within the Requestor, which is not secure. It is common knowledge a program executable can be disassembled by unscrupulous individuals, and the embedded private key discovered, thereby providing unlimited, unwanted access to the encrypted data.

In some embodiments of the present invention, a system provides a secure means of programmatically acquiring a private key to access encrypted data, by using the program executable's digital signature as the password to gain access to the private key. This invention has a token (or smart chip) containing a secure, private area. This secure, private area contains a list of one or more private key(s)(referred to as the "Key List"), a list of known digital signatures (referred to as the "Signature List") each of which is associated with one of the private keys in the key list, and lastly, a software program functioning as a "Gatekeeper."

In some embodiments of the present invention, when a Requestor requires a private key to decrypt encrypted data, the Requestor, which must be digitally signed, makes a request for the private key to the Gatekeeper on the token/smart chip. The Gatekeeper obtains the digital signature of the Requestor, and if it determines the digital signature to be valid, then compares it to the entries on the Signature List. If a match is found, the Gatekeeper obtains the stored private key from the Key List associated with the digital signature on the Signature List, and returns it to the Requestor for use in decrypting the encrypted data.

In some embodiments of the present invention, once the Requestor decrypts the encrypted data, the Requestor clears the private key from its memory, and takes whatever action is programmed.

It should be noted when a digitally signed program is modified after its digital signature is generated, the digital signature is broken, and in the case of the present invention, a Requestor with a broken digital signature would generally never be granted access by the Gatekeeper to the private key. This prevents unauthorized modifications to the program executable for the purpose of unscrupulously gaining access to the private key, and subsequently the encrypted data.

In some embodiments of the present invention, part of the authentication may be accomplished when verifying a license is to have the token that holds the private key perform a digital signature verification of the requesting program. If the digital signature is not broken and matches what is expected then the program is authenticated and the license verification proceeds.

In some embodiments, the limitation that prevents this from functioning is due to the inaccessibility of the file system on the PC by the Token. For example in Windows if the token is connected to the USB port the user from the PC can access the token or at least the data area exposed on the token. However the token cannot access the PC file system through the operating system. This is prevented as a means to eliminate virus code from infecting the PC through the USB connection. In the present invention, though, it prevents the token from verifying the digital signature since it cannot see the file of the program and access it to obtain the signature to verify.

In some embodiments, the issue is one of authentication of the requesting program that is attempting to verify the license. Our current solution is to add some functions to the original invention and to incorporate them using a piece of the Persistence Software Integrity (PSI) invention. Part of the PSI invention is a maintenance process that runs in the background and uses certain Stealth Execution characteristics in order to prevent its termination or removal. This means that this process is constantly running each time after the first execution of the protected application. With this process running it can be constantly listening for events indicating a new connection to the PC has occurred. Each time it can "ping" the system for the expected web service that would be present when a connection has been made to a token.

In some embodiments, the PSI maintenance process can verify the digital signatures with the Token. If the digital signatures are verified then the Token could provide single-use keys that could then be embedded by the maintenance process into the protected application for use by the license verification code, to send to the Token in order to authenticate a license verification request. Since the key is a single-use key once it is sent to the Token it is removed by the license verification logic. If a given instance of the license verification logic does not have a single-use key then it cannot perform the verification. As such, if the Token is removed the license verification code will attempt a connection and fail, but also remove the existing keys such that all the verifications would no longer have the necessary keys and would thus remove the licensed access to the protected program.

Figure 15:
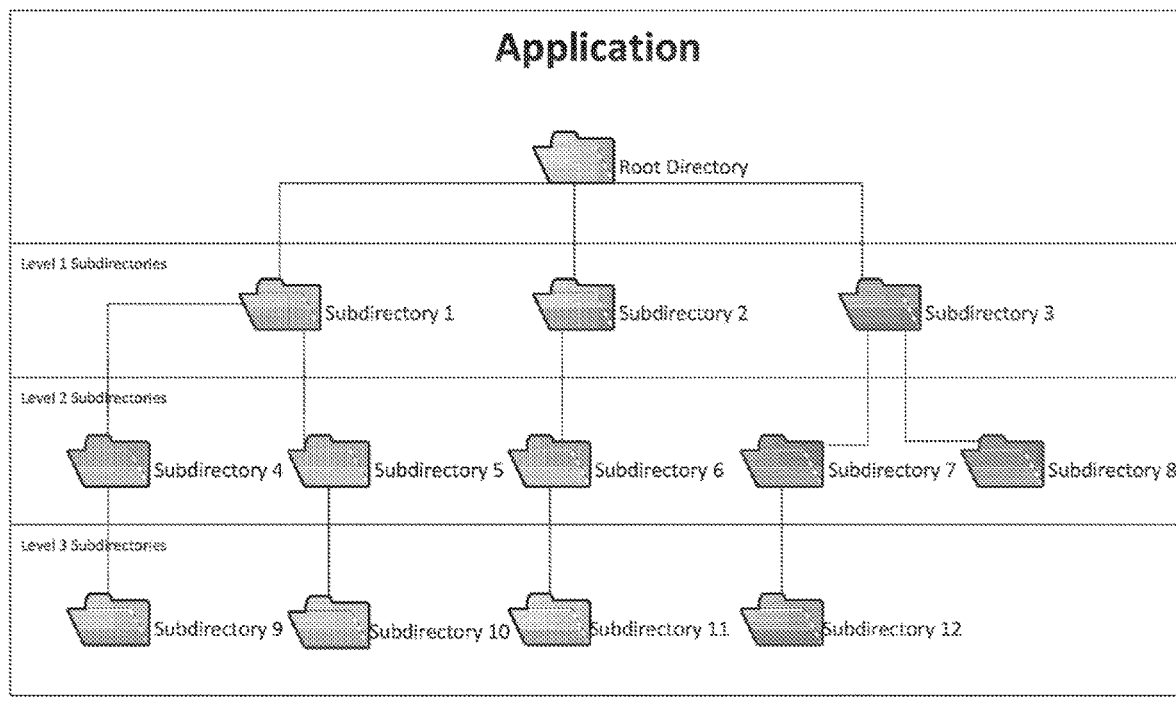
FIG. 15 illustrates an exemplary directory structure of an application as having multiple folders on multiple levels according to certain exemplary aspects of the present disclosure.

According to some embodiments of the present disclosure, FIG. 15 illustrates an exemplary directory structure of an application as having multiple folders on multiple levels. This structure can be very unique for a given application and can offer numerous locations for embedding logic.

Figure 16:
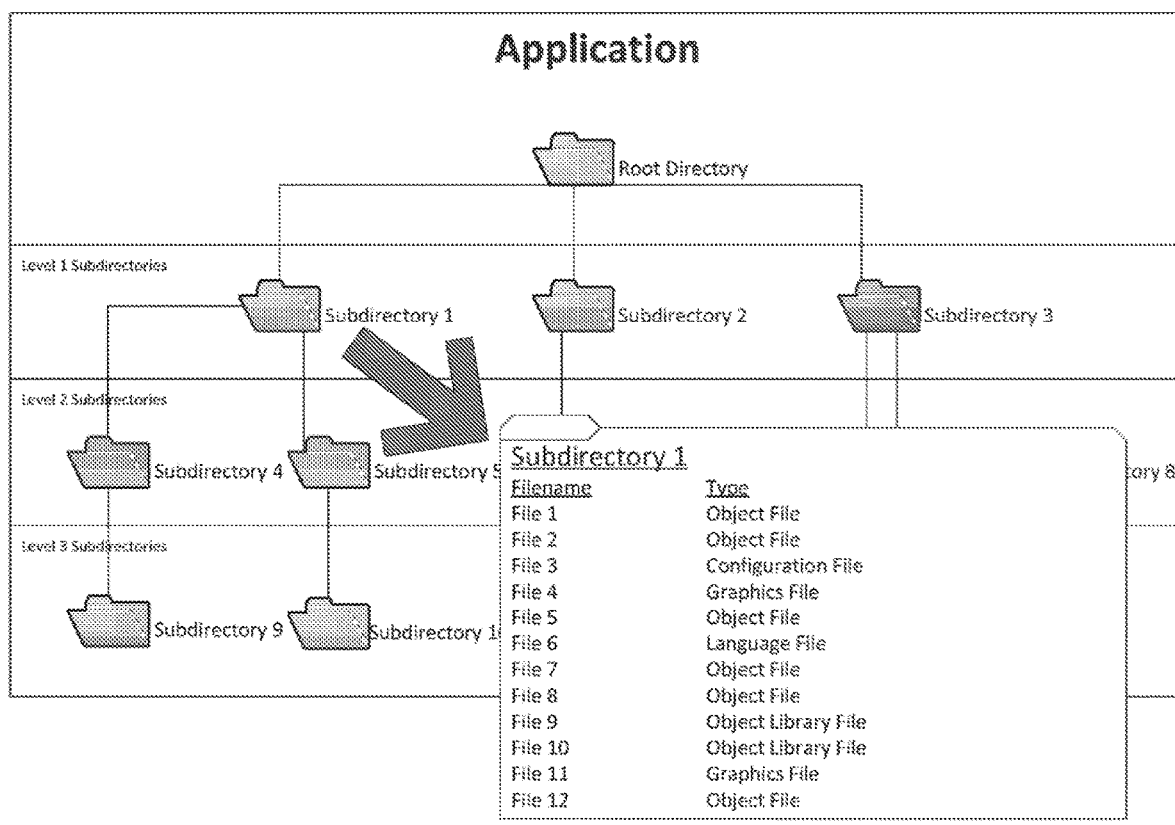
FIG. 16 illustrates a directory structure substantially similar to that depicted in FIG. 15, but with the contents of a given subdirectory displayed, according to certain exemplary aspects of the present disclosure.

Referring now to FIG. 16, a directory structure substantially similar to that depicted in FIG. 15 is illustrated, but with the contents of a given subdirectory displayed. These contents can be of varying file types and can offer numerous locations for embedding logic. As such they need to be scanned and identified.

Referring now to FIG. 17A-17E, exemplary locations that can be found within each file type for embedding logic are illustrated. The Object files (e.g., FIG. 17A) and Library files (e.g. FIG. 17C) may be primarily machine language compiled source code into which external logic can be moved to locations as defined by entry and exit points. Graphics files (e.g. FIG. 17E) provide some locations where embedded logic could be inserted and that would execute each time a graphic is displayed. The Configuration file (e.g. FIG. 17B) provides a storage area where dormant logic could be embedded for safe keeping and use later. The Dummy Embed file (e.g. FIG. 17D) is an example of false files that could be created and embedded in the directory structure. The Dummy file could even have logic embedded that executes the files to execute the embedding logic.

Figure 18C:
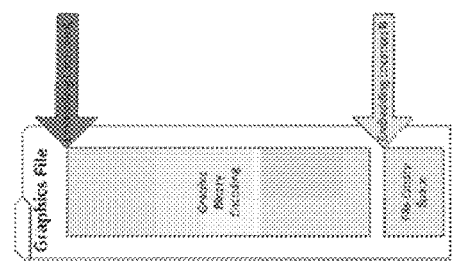
FIG. 18A-18C depict exemplary locations that may be selected for Persistent Software Integrity logic and some for the Logic Payload according to certain exemplary aspects of the present disclosure.
Figure 18A:
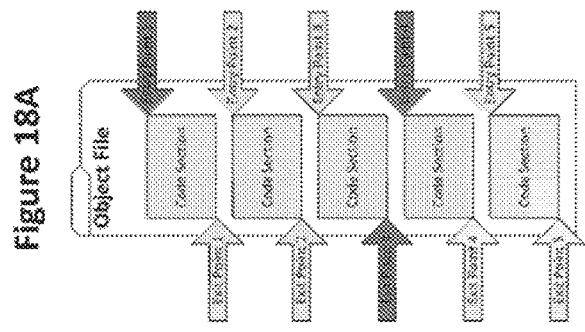
Figure 18B:
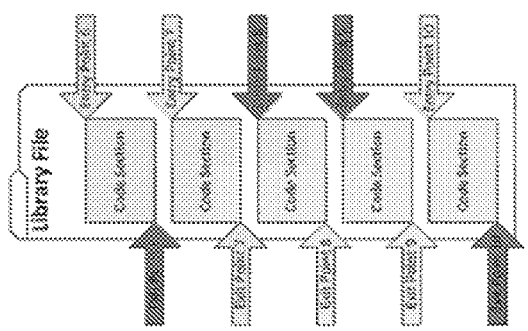

Referring now to FIG. 18A-18C, exemplary locations that may be selected for Persistent Software Integrity logic and some for the Logic Payload itself are presented. The RED or darker shaded locations represent where Persistent Integrity Logic was embedded and YELLOW or lighter shaded regions represent the Logic Payload. This could be the state of the application immediately after infection.

Referring now to FIG. 19A-19C, an application substantially similar to the one depicted in FIGS. 18A-18C is illustrated, but illustrates how the same application might appear when an install of the application is initiated. The Persistent Software Integrity logic may be constantly moving the logic around from location to location and you will notice that many of the arrows have changed color indicating a move of the logic has occurred. Each time the program is installed the embedded logic would be moved as well as each time the program is used, the Persistent Software Integrity logic would rearrange where in the application both the logic payload and itself are located.

Multidimensional Table Modification: In some embodiments, a multidimensional table may be included that makes use of a group of Command Semaphores that can provide the order creation, destruction, and/or modification of the data in the multidimensional table. Modifications may be performed by individual side, row, or columns as well as by a range of sides, rows, or columns within the multidimensional table. The functions that could be done to these table locations include, but are not limited to: Deletion of multidimensional table data such as the elimination of columns or rows in the table as well as the elimination of sides; Modification of data within a column, row, or side to adjust the values using a random sync point to create an ordered source of values to use in the modification; Addition of multidimensional table data such as the creation of new columns, rows, or sides within the table using a random sync point to create an ordered source of value to use; Modification of the data within a column, row, or side using a known algorithmic function that adjusts each value processed in the table. Such modifications may be used with on-the-fly algorithmic function creation to further randomize the process and make determining the change that occurred much more difficult to discern.

On-the-fly Sync Point Reset: This feature involves the sudden change in the entire environment to a new sync point, which would mean the destruction of the current environment and the creation of completely new tables including the multidimensional table, the command semaphore cross-reference table, and the execution step cross-reference table. It would be done either to confuse a possible attack or as a preventative measure to further increase the security of the encryption. It could also be used as a maintenance measure in cases where possible corruption has occurred in the environment and creation of a new clean environment is desired.

Encrypted Payload Container: This feature may involve creation of a self-contained viewer that runs like a program to allow the user to view the data, but prevents copying, cutting, printing, or otherwise modifying the encrypted data. This container requires connection to the DARE Encryption engine to function and is intended to provide controls to the encrypting entity over how the sensitive data payload can be used by the decrypting entity. The encrypting entity may have the ability to control just how restrictive the container is with the payload. Additionally the encrypting entity may have control over whether the container can be re-encrypted for a different environment in order for it to be forwarded to another party. These controls may allow the encrypting entity the ability to further protect the sensitive payload they are conveying to another entity.

Expiring Encryption: This feature may allow the encrypting entity the ability to set an expiration period for the encryption and then what is to happen to the payload when that period expires. The period can be set by, for example, length of time (e.g., 45 days, 3 months, etc.), by specific date (e.g., Mar. 5, 2017), or by number of decryptions (number of times accessed by decrypting entity). Once this period expires the encrypting entity may then choose to destroy the payload or leave the payload in a decrypted form for the decrypting party to do with as they please.

Payload View Restrictions: This feature involves the ability for the encrypting entity to restrict to a secondary level who may view or otherwise decrypt the payload. It provides the means by which a payload may be be encrypted and passed to a decrypting entity who has the ability to decrypt, but not view the data and thus could re-encrypt to forward on to another entity who does have permission to decrypt and view the payload. This feature may be accomplished through the use of a secondary known sync point or environment that may then be encapsulated within a primary known sync point or environment thus creating a transportable protected payload.

FIPS Compliant Setting: This feature relates to FIPS certification. In some embodiments, it would restrict the presently disclosed systems and methods to use of only FIPS certified encryption algorithms such as AES and DES3, when optionally desired by a user.

Further Modularity in the use of Encryption Packages: In some embodiments, encryption packages may be introduced such that new packages could be remotely installed and activated. This feature would allow for the addition of new encryption algorithms, which would in turn increase the security. In such embodiments, it may be necessary to include an encryption level identifier to allow one copy of an Encryption engine to know what encryption algorithms were available to another Encryption engine and thus limit what encryption algorithms were used to ensure the decrypting entity has the ability to decrypt the payload. This feature could similarly be used to add new features to the presently disclosed system by, for example, remote installation and/or updates.

Computer-Implemented Systems

As will be appreciated by one of skill in the art, aspects or portions of the present approach may be implemented by a computer-based system, whether as a method, system, or at least in part, on a computer-readable medium. Accordingly, the present approach may take the form of combination of hardware and software embodiments (including firmware, resident software, micro-code, etc.) or an embodiment combining software and hardware aspects that may all generally be referred to herein as a "circuit," "module," or "system." Furthermore, the present approach may take the form of a computer program product on a computer-readable medium having computer-usable program code embodied in the medium. The present approach might also take the form of a combination of such a computer program product with one or more devices, systems relating to communications, control, or an integrated remote-control component, etc. In the present system, a receiver or graphic user interface may also symbolically take the form of an Input Device as depicted, for example, in FIG. 23. It is contemplated that such an Input Device will be adapted for the particular application.

For computer programming support, any suitable non-transient or transitory computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the non-transitory computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a device accessed via a network, such as the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then transitioned to and/or stored in a computer memory. In the context of this document, a computer-usable or computer-readable medium may be any non-transitory medium that can contain, store, communicate, propagate, or transport the program for use by or in connection with the instruction execution system, apparatus, or device.

Computer program code for implementing or carrying out operations of the present system may be written in an object-oriented programming language such as Java, C++, etc. However, the computer program code for carrying out operations of the present approach may also be written in conventional procedural programming languages, such as the "C" programming language or similar programming languages. The program code may execute entirely on the embedded microcontroller(s), microprocessor(s), microcomputer(s), user's computer (sometimes generically referred to as a computer processor in conjunction with some storage memory or medium), whether partly on the user's computer or as a stand-alone software package, partly on a user's computer and partly on a remote computer, or entirely on the remote computer or server. In the latter scenario, the remote computer may be connected to the user's computer (wired or wirelessly) through a local area network (LAN) or a wide area network (WAN), or the connection may be made to an external computer (for example, through the Internet using an Internet Service Provider). A user's computer may include computer tablets, cellular telephones, or other such devices common in broadband computing environments.

The present approach may be described with reference to flowchart illustrations and/or block diagrams of methods, apparatus (systems) and computer program products according to embodiments of the approach. It will be understood that each block of a flowchart illustration and/or block diagram may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Any computer program instructions may also be stored in a non-transient computer-readable memory, including a networked or cloud-accessible memory, that can direct a computer or other programmable data-processing apparatus to function in a particular manner, such that the instructions stored in the computer-readable memory produce an article of manufacture including instruction means which implement the function/act specified in the flowchart and/or block diagram block or blocks.

Any computer program instructions may also be loaded onto a computer or other programmable data-processing apparatus to specially configure it to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

Any prompts associated with the present approach may be presented and responded to via a graphical user interface (GUI) presented on the display of the mobile communications device, a heads up display, a head mounted screen, or the like. Prompts may also be audible, vibrating, etc.

Any flowcharts and block diagrams in the Figures illustrate the architecture, functionality, and operation of possible implementations of systems, methods and computer program products according to various embodiments of the present approach. In this regard, each block may alternatively represent a module, segment, or portion of code, which comprises one or more executable instructions for implementing the specified logical function(s). It should also be noted that, in some alternative implementations, the functions noted in a block may occur out of the order noted in the figures, or may be optional. In some cases, a block may be provided for contextual detail or completeness, even though, for example, the contents may be trivial from a programming perspective. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

That which is claimed:

1. A management system for deployment within a computer network for the secure control of a software application within the network, the system comprising:
   a computer network having at least one client computer processor and client storage medium, at least one computer processor, and a storage medium, the software application installed on the client storage medium, the computer processor specifically configured by computer program code installed on the storage medium for performing a method comprising:
   a. scanning the client storage medium for the software application object code to identify directory structure, folder names, object files and their location, entry points, and exit points within the object code;
   b. cataloguing the directory structure, folder names, object files and their location, entry points, and exit points within the object code within a manifest file associated with the software application, wherein the manifest file includes indicia of locations suitable for installation of protection logic;
   c. generating a first pseudo-random number and inserting protection logic into the software application object code by binding the protection logic to a plurality of object files to form embedded logic at entry points of the object files, the object files selected as a function of the first pseudo-random number applied to the manifest file, wherein the embedded logic includes an embedded logic payload;
   d. wherein, upon executing an object file having embedded logic, the embedded logic:
      i. communicates with the medium to verify the status of the software application on the client computer using the embedded logic payload;
      ii. generates a second pseudo-random number;
      iii. binds the protection logic to a different object file entry point, the different object file selected as a function of the second pseudo-random number applied to the manifest file;
      iv. removes the embedded logic from the executed object file;
   and
   e. scanning the software application object code at a desired frequency to verify integrity of composition of the software application with respect to the manifest file and the presence of at least one instance of the embedded logic within the software application;
   the management system further comprising an endpoint management system having an endpoint token with an endpoint processor and a memory storage module, wherein a secure storage area of the storage medium is capable of maintaining secure data and a list of recognized digital signatures eligible for access to the secure cryptographic data; and further wherein a gatekeeper application is configured to run on the end point token to verify the status by:
   a. receiving a request from the client processor for access to secure data on the license computer;
   b. acquiring and comparing a digital signature of the software application to a list of digital signatures eligible for access to the secure licensed data, wherein the list of eligible digital signatures is maintained on the computer processor and determining whether a license of the software application of the client processor is valid;
   c. communicating to the embedded logic whether the software application's license is valid; and
   d. if the software application's license is valid, granting access to the secure license data.

2. A management method for deployment within a computer network for the secure control of a software application within the network, the network having at least one client computer processor and client storage medium, at least one license computer processor and license storage medium, the software application installed on the client storage medium, the method comprising:
   a. scanning the client storage medium for the software application object code to identify directory structure, folder names, object files and their location, entry points, and exit points within the object code;

b. cataloguing the directory structure, folder names, object files and their location, entry points, and exit points within the object code within a manifest file associated with the software application, wherein the manifest file includes indicia of locations suitable for installation of licensing protection logic;
c. generating a first pseudo-random number and inserting licensing protection logic into the software application object code by binding the license protection logic to a plurality of object files to form embedded logic at entry points of the object files, the object files selected as a function of the first pseudo-random number applied to the manifest file, wherein the embedded logic includes an embedded logic payload;
d. wherein, upon executing an object file having embedded logic, the embedded logic:
  i. communicates with the license medium to verify license status of the software application on the client computer using the embedded logic payload;
  ii. generates a second pseudo-random number;
  iii. binds license protection logic to a different object file entry point, the different object file selected as a function of the second pseudo-random number applied to the manifest file;
  iv. removes the embedded logic from the executed object file;
and
e. scanning the software application object code at a desired frequency to verify integrity of composition of the software application with respect to the manifest file and the presence of at least one instance of the embedded logic within the software application;
the computer network further comprising an endpoint management system having an endpoint token with an endpoint processor and a memory storage module, wherein a secure storage area of the storage medium is capable of maintaining secure data and a list of recognized digital signatures eligible for access to the secure cryptographic data; and further wherein a gatekeeper application is configured to run on the end point token to verify the status by performing the steps of:
a. receiving a request from the client processor for access to secure data on the license computer;
b. acquiring and comparing a digital signature of the software application to a list of digital signatures eligible for access to the secure licensed data, wherein the list of eligible digital signatures is maintained on the computer processor and determining whether a license of the software application of the client processor is valid;
c. communicating to the embedded logic whether the software application's license is valid; and
d. if the software application's license is valid, granting access to the secure license data.

3. The method of claim 2, wherein the license storage medium is a secure portion of the client storage medium and the license computer processor and client computer processor are the same computer processor.

4. The method of claim 2, wherein the license medium is disposed on the endpoint token.

5. A management system for deployment within a computer network for the secure control of a software application within the network, the system comprising:
a computer network having at least one client computer processor and client storage medium, at least one computer processor, and a storage medium, the software application installed on the client storage medium, the computer processor specifically configured by computer program code installed on the storage medium for performing a method comprising:
a. scanning the client storage medium for the software application object code to identify directory structure, folder names, object files and their location, entry points, and exit points within the object code;
b. cataloguing the directory structure, folder names, object files and their location, entry points, and exit points within the object code within a manifest file associated with the software application, wherein the manifest file includes indicia of locations suitable for installation of protection logic;
c. generating a first pseudo-random number and inserting protection logic into the software application object code by binding the protection logic to a plurality of object files to form embedded logic at entry points of the object files, the object files selected as a function of the first pseudo-random number applied to the manifest file, wherein the embedded logic includes an embedded logic payload;
d. wherein, upon executing an object file having embedded logic, the embedded logic:
  i. communicates with the medium to verify the status of the software application on the client computer using the embedded logic payload;
  ii. generates a second pseudo-random number;
  iii. binds the protection logic to a different object file entry point, the different object file selected as a function of the second pseudo-random number applied to the manifest file;
  iv. removes the embedded logic from the executed object file;
and
e. scanning the software application object code at a desired frequency to verify integrity of composition of the software application with respect to the manifest file and the presence of at least one instance of the embedded logic within the software application;
the management system further comprising an endpoint management system having an endpoint token with an endpoint processor and a memory storage module, wherein a secure storage area of the storage medium is capable of maintaining secure data and a list of recognized digital signatures eligible for access to the secure cryptographic data; and further wherein a gatekeeper application is configured to run on the end point token to verify the status by:
a. receiving a request from the client processor for access to secure data on the license computer;
b. acquiring and comparing a digital signature of the software application to a list of digital signatures eligible for access to the secure licensed data, wherein the list of eligible digital signatures is maintained on the computer processor and determining whether a license of the software application of the client processor is valid;
c. communicating to the embedded logic whether the software application's license is valid; and
d. if the software application's license is valid, granting access to the secure license data.

6. A management method for deployment within a computer network for the secure control of a software application within the network, the network having at least one client computer processor and client storage medium, at least one computer processor and storage medium, the software application installed on the client storage medium, the method comprising:
 a. scanning the client storage medium for the software application object code to identify directory structure, folder names, object files and their location, entry points, and exit points within the object code;
 b. cataloguing the directory structure, folder names, object files and their location, entry points, and exit points within the object code within a manifest file associated with the software application, wherein the manifest file includes indicia of locations suitable for installation of protection logic;
 c. generating a first pseudo-random number and inserting protection logic into the software application object code by binding the protection logic to a plurality of object files to form embedded logic at entry points of the object files, the object files selected as a function of the first pseudo-random number applied to the manifest file, wherein the embedded logic includes an embedded logic payload;
 d. wherein, upon executing an object file having embedded logic, the embedded logic:
  i. communicates with the medium to verify status of the software application on the client computer using the embedded logic payload;
  ii. generates a second pseudo-random number;
  iii. binds protection logic to a different object file entry point, the different object file selected as a function of the second pseudo-random number applied to the manifest file;
  iv. removes the embedded logic from the executed object file;
 and
 e. scanning the software application object code at a desired frequency to verify integrity of composition of the software application with respect to the manifest file and the presence of at least one instance of the embedded logic within the software application;
 the computer network further comprising an endpoint management system having an endpoint token with an endpoint processor and a memory storage module, wherein a secure storage area of the storage medium is capable of maintaining secure data and a list of recognized digital signatures eligible for access to the secure cryptographic data; and further wherein a gatekeeper application is configured to run on the end point token to verify the status by performing the steps of:
 a. receiving a request from the client processor for access to secure data on the license computer;
 b. acquiring and comparing a digital signature of the software application to a list of digital signatures eligible for access to the secure licensed data, wherein the list of eligible digital signatures is maintained on the computer processor and determining whether a license of the software application of the client processor is valid;
 c. communicating to the embedded logic whether the software application's license is valid; and
 d. if the software application's license is valid, granting access to the secure license data.

7. The method of claim 6, wherein the storage medium is a secure portion of the client storage medium and the computer processor and client computer processor are the same computer processor.

8. The method of claim 6, wherein the medium is disposed on the endpoint token.

* * * * *